(12) United States Patent
Meng et al.

(10) Patent No.: US 11,269,084 B2
(45) Date of Patent: Mar. 8, 2022

(54) GAMMA CAMERA FOR SPECT IMAGING AND ASSOCIATED METHODS

(71) Applicant: THE BOARD OF TRUSTEES OF THE UNIVERSITY OF ILLINOIS, Urbana, IL (US)

(72) Inventors: Ling-Jian Meng, Champaign, IL (US); Xiaochun Lai, Arlington Heights, IL (US); Elena Maria Zannoni, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/580,711

(22) Filed: Sep. 24, 2019

(65) Prior Publication Data
US 2020/0096652 A1    Mar. 26, 2020

Related U.S. Application Data

(60) Provisional application No. 62/735,474, filed on Sep. 24, 2018.

(51) Int. Cl.
*G01T 1/164*    (2006.01)

(52) U.S. Cl.
CPC .................. *G01T 1/1642* (2013.01)

(58) Field of Classification Search
CPC ..... G01T 1/1642; G01T 1/249; G01T 1/1644; G01T 1/1648; G01T 1/1647; A61B 6/4291; A61B 6/06
See application file for complete search history.

(56) References Cited

U.S. PATENT DOCUMENTS

| | | | |
|---|---|---|---|
| 6,838,672 B2 | 1/2005 | Wagenaar et al. | |
| 7,180,074 B1 * | 2/2007 | Crosetto | G01T 1/1611 |
| | | | 250/370.09 |

(Continued)

FOREIGN PATENT DOCUMENTS

| | | |
|---|---|---|
| EP | 2360494 A2 | 8/2011 |
| EP | 2482101 A1 | 1/2012 |

(Continued)

OTHER PUBLICATIONS

Accorsi, et al., "Preliminary evaluation of the tomographic performance of the mediSPECT small animal imaging system," Nuclear Instruments & Methods in Physics Research Section a—Accelerators Spectrometers Detectors and Associated Equipment, vol. 571, pp. 415-418,, Nov. 13, 2006.

(Continued)

*Primary Examiner* — David P Porta
*Assistant Examiner* — Mamadou Faye
(74) *Attorney, Agent, or Firm* — Guntin & Gust, PLC; Matthew Tropper

(57) ABSTRACT

Aspects of the subject disclosure may include, for example, a device comprising: a first micro-camera-element comprising a first sensor area and a first aperture element, the first aperture element having a first structural configuration, the first aperture element and the first sensor area being disposed relative to each other in order to cooperate in obtaining first imaging data having first characteristics, and the first characteristics comprising first imaging resolution and first angular coverage; a second micro-camera-element comprising a second sensor area and a second aperture element, the second aperture element having a second structural configuration, the second aperture element and the second sensor area being disposed relative to each other in order to cooperate in obtaining second imaging data having second (Continued)

characteristics, the second characteristics comprising second imaging resolution and second angular coverage, and the first imaging resolution differing from the second imaging resolution, the first angular coverage differing from the second angular coverage, or any combination thereof. Additional embodiments are disclosed.

20 Claims, 28 Drawing Sheets

(56) References Cited

U.S. PATENT DOCUMENTS

| | | | |
|---|---|---|---|
| 7,332,722 | B1 | 2/2008 | Tran et al. |
| 7,838,838 | B2 | 11/2010 | Rousso et al. |
| 8,198,594 | B2 | 6/2012 | Beekman |
| 8,520,800 | B2 | 8/2013 | Wilfley et al. |
| 8,866,097 | B2 | 10/2014 | Meng |
| 2003/0111610 | A1 | 6/2003 | Wagenaar et al. |
| 2007/0265230 | A1 | 11/2007 | Rousso et al. |
| 2008/0042067 | A1 | 2/2008 | Rousso et al. |
| 2008/0095414 | A1 | 4/2008 | Desh et al. |
| 2009/0114825 | A1 | 5/2009 | Beekman |
| 2009/0159802 | A1 | 6/2009 | Beekman |
| 2011/0158384 | A1 | 6/2011 | Beekman |
| 2012/0033790 | A1 | 2/2012 | Wilfley et al. |
| 2012/0039446 | A1* | 2/2012 | Cui .................. A61B 6/4291 378/149 |
| 2014/0226784 | A1 | 8/2014 | Meng |
| 2018/0172847 | A1* | 6/2018 | Nelson .................. A61B 6/035 |

FOREIGN PATENT DOCUMENTS

| | | |
|---|---|---|
| NL | 2007596 C | 4/2013 |
| WO | 2007133068 A2 | 11/2007 |

OTHER PUBLICATIONS

Ahn, et al., "Analysis of resolution and noise properties of nonquadratically regularized image reconstruction methods for PET," IEEE Trans. Med. Imag., vol. 27, pp. 413-424, 2008.

Ahn, et al., "Convergent incremental optimization transfer algorithms: application to tomography," IEEE Trans. Med. Imag., vol. 25, pp. 283-296, 2006.

Ahn, et al., "Globally convergent image reconstruction for emission tomography using relaxed ordered subsets algorithms," IEEE Trans. Med. Imag., vol. 22, pp. 613-626, 2003.

Asma, et al., "Mean and covariance properties of dynamic PET reconstructions from list-mode data," IEEE Trans. Med. Imag., vol. 25, pp. 42-54, 2006.

Bai, et al., "Magnetic Resonance-Guided Positron Emission Tomography Image Reconstruction," Seminars in Nuclear Medicine, vol. 43, pp. 30-44, 2013.

Bai, B. et al., "Model-based normalization for iterative 3D PET image reconstruction," Physics in medicine and biology, pp. 2773-2784, 2002.

Bai, B. et al., "Positron range modeling for statistical PET image reconstruction," in Proc. IEEE Nuclear Science Symp. Medical Imaging Conf., 2003, pp. 2501-2505.

Barrett, et al., "Adaptive SPECT," Ieee Transactions on Medical Imaging, vol. 27, pp. 775-788, Jun. 2008.

Beekman, et al., "Design and simulation of a high-resolution stationary SPECT system for small animals," Physics in medicine and biology, vol. 49, pp. 4579-4592, Oct. 7, 2004.

Beekman, et al., "3D rat brain phantom for high-resolution molecular imaging", Proc. IEEE 97 1997-2005, Jan. 2010.

Beekman, Freek J. et al., "Design and simulation of U-SPECT, an ultra-high resolution molecular imaging system" pp. 792-796, IEEE, 2003.

Blankenburg, et al., "in vivo detection and imaging of phosphatidylserine expression during programmed cell death," Proc. Natl. Acad. Sci., vol. 95, pp. 6349-6354, May 1998.

Bocher, M. et al., "A fast cardiac gamma camera with dynamic SPECT capabilities: Design, system validation and future potential", Eur. J. Nucl. Med. Mol. Imaging 37, pp. 1887-1902 10.1007/s00259-010-1488-z, 2010.

Bonetto, et al., "Covariance approximation for fast and accurate computation of channelized Hotelling observer statistics," Ieee Transactions on Nuclear Science, vol. 47, pp. 1567-1572, Aug. 2000.

Bruckner, et al., "Microoptical Artificial Compound Eyes," Flying Insects and Robots, pp. 127-142, 2009.

Cai, I. et al., "First Imaging Result with an Ultrahigh Resolution Stationary MR Compatible SPECT System," IEEE NSS/MIC Conference Record, 2012, MRC-SPECT, CA.

Cai, L. et al., "MRC-SPECT: A sub-500um resolution MR-compatible SPECT system for simultaneous dualmodality study of small animals", Nuclear Instruments and Methods in Physics Research Section A: Accelerators, Spectrometers, Detectors and Associated Equipment, 2013, 147-151.

Clarkson, et al., "A task-based approach to adaptive and multimodality imaging," Proceedings of the Ieee, vol. 96, pp. 500-511, Mar. 2008.

Deleye, et al., "Performance evaluation of small-animal multipinhole mu SPECT scanners for mouse imaging," European Journal of Nuclear Medicine and Molecular Imaging, vol. 40, pp. 744-758, May 2013.

Descour, et al., "Toward the development of miniaturized Imaging systems for detection of pre-cancer," Ieee Journal of Quantum Electronics, vol. 38, pp. 122-130, Feb. 2002.

Duparre, et al., "Micro-optical artificial compound eyes," Bioinspiration & Biomimetics, vol. 1, pp. R1-R16, Mar. 2006.

Finck, et al., "100 micron digitization resolution is optimal for x-rays for a large multicenter trial in rheumatoid arthritis (RA)." Arthritis and Rheumatism, vol. 40, pp. 1544-1544, Sep. 1997.

Freed, et al., "A prototype instrument for single pinhole small animal adaptive SPECT imaging," Medical Physics, vol. 35, pp. 1912-1925, May 2008.

Hnatowich, , "Technetium-99m labeling of DNA oligonucleotides," Journal of Nuclear Medicine, vol. 36, pp. 2306-2314, 1995.

Hom, et al., "Technetium-99m-Labeled Receptor-Specific Small-Molecule Radiopharmaceuticals: Recent Developments and Encouraging Results," Nuclear Medicine and Biology, vol. 24, pp. 485-498, Aug. 1997.

Imbert, L. et al., "Compared Performance of High-Sensitivity Cameras Dedicated to Myocardial Perfusion SPECT: A Comprehensive Analysis of Phantom and Human Images", J. Nucl. Med., vol. 53 No. 12, 2012, 1897-1903.

Jeong, et al., "Biologically inspired artificial compound eyes," Science, vol. 312, pp. 557-561, Apr. 28, 2006.

Jimenez-Cruz, et al., "The use of low glycemic and high satiety index food dishes in Mexico: a low cost approach to prevent and control obesity and diabetes," Nutricion Hospitalaria, vol. 21, pp. 353-356, May-Jun. 2006.

Kastis, et al., "Compact CT/SPECT small-animal imaging system," Ieee Transactions on Nuclear Science, vol. 51, pp. 63-67, Feb. 2004.

Katzenellenbogen, et al., "Tumor receptor imaging: Proceedings of the National Cancer Institute workshop, review of current work, and prospective for further investigations," Clin. Cancer Res., vol. 1, pp. 921-932, 1995.

Kim, Jaeyoun , "Absorption-assisted mode transformation in butterfly compound eyes", Scientific reports, 4, 2014, 1-7.

Lai, et al., "Artificial compound-eye gamma camera for MRI compatible SPECT imaging", 2013 IEEE Nuclear Science Symp. and Medical Imaging Conf. (NSS/MIC), 1-7 pp.

Lai, Xiaochun et al., "Simulation study of the second-generation MR-compatible SPECT system based on the inverted compound-eye gamma camera design", Phys Med Biol, vol. 63, No. 4, p. 045008, Feb. 12, 2018.

Li, et al., "A fast fully 4-D incremental gradient reconstruction algorithm for list mode PET data," IEEE Trans. Med. Imag., vol. 26, pp. 58-67, 2007.

(56) References Cited

OTHER PUBLICATIONS

Li, et al., "Accurate estimation of the fisher information matrix for the PET image reconstruction problem," IEEE Trans. Med. Imag., vol. 23, pp. 1057-1064, 2004.

Li, et al., "Adaptive Angular Sampling for SPECT Imaging," Ieee Transactions on Nuclear Science, vol. 58, pp. 2205-2218, Oct. 2011.

Li, Q. et al., "Fast hybrid algorithms for PET image reconstruction," in Proc. IEEE Nuclear Science Symp. Medical Imaging Conf., 2005, pp. 1851-1855.

Lin, Y. et al., "Fast GPU-based time-of-flight MAP reconstruction with a factored system matrix," in Nuclear Science Symposium Conference Record (NSS/MIC), IEEE, 2010, pp. 2889-2893, Abstract only.

Meier, Dirk et al., "A SPECT camera for simultaneous SPECT/MRI", IEEE Nuclear Science Symp. Conf. Record, 2009, 2313—8 pp.

Melder, et al., "Systematic distribution and tumor localization of adoptively transferred lymphocytes in mice: Comparison with physiologically based pharmacokinetic model," Neoplasia, vol. 4, pp. 3-8, Jan.-Feb. 2002.

Meng, , "An intensified EMCCD camera for low energy gamma ray imaging applications," Ieee Transactions on Nuclear Science, vol. 53, pp. 2376-2384, Aug. 2006.

Meng, et al., "An ultrahigh resolution SPECT system for I-125 mouse brain imaging studies," Nuclear Instruments & Methods in Physics Research Section a—Accelerators Spectrometers Detectors and Associated Equipment, vol. 600, pp. 498-505, Mar. 1, 2009.

Meng, et al., "Design and feasibility study of a single photon emission microscope system for small animal I-125 imaging," Ieee Transactions on Nuclear Science, vol. 53, pp. 1168-1178, Jun. 2006.

Meng, et al., "Investigation of the Intrinsic Spatial Resolution of an Intensified EMCCD Scintillation Camera," Ieee Transactions on Nuclear Science, vol. 55, pp. 2508-2517, Oct. 2008.

Meng, et al., "Preliminary evaluation of a novel energy-resolved photon-counting gamma ray detector," Nuclear Instruments and Methods in Physics Research Section A: Accelerators, Spectrometers, Detectors and Associated Equipment), vol. 604, pp. 548-554, 2009.

Meng, et al., "Spectroscopic performance of thick Hgl2 detectors," Ieee Transactions on Nuclear Science, vol. 53, pp. 1706-1712, Jun. 2006.

Meng, L. et al., "Development of a novel energy-resolved photon-counting detector for gamma ray imaging applications," in Hard X-Ray, Gamma-Ray, and Neutron Detector Physics XI, San Diego, CA, 2009, Abstract only.

Mok, et al., "Evaluation of a Multi-pinhole Collimator for Imaging Small Animals with Different Sizes," Molecular Imaging and Biology, vol. 14, pp. 60-69, Feb. 2012.

Mumcuoglu, et al., "Fast gradient-based methods for Bayesian reconstruction of transmission and emission PET images," IEEE Trans. Med. Imag., vol. 13, pp. 687-701, Dec. 1994.

Mumcuoglu, E.U. et al., "A phantom study of the quantitative behavior of Bayesian PET reconstruction methods," in Proc. IEEE Nuclear Science Symp. Medical Imaging Conf., 1995, pp. 1703-1707.

Mumcuoglu, E.U. et al., "Accurate geometric and physical response modelling for statistical image reconstruction in high resolution PET," in Proc. IEEE Nuclear Science Symp. Medical Imaging Conf., 1996, pp. 1569-1573.

Munch, Gotz et al., "Myocardial technetium-99m-tetrofosmin and technetium-99m-sestamibi kinetics in normal subjects and patients with coronary artery disease", Journal of Nuclear Medicine, vol. 38 (3), 1997.

Nichols, et al., "Spatiotemporal reconstruction of list mode PET data," IEEE Trans. Med. Imag., vol. 21, pp. 396-404, Apr. 2002.

Peterson, et al., "Application of silicon strip detectors to small-animal imaging," Nuclear Instruments & Methods in Physics Research A, vol. 505, pp. 608-611, Jun. 1, 2003.

Qi, et al., "A theoretical study of the contrast recovery and variance of MAP reconstructions with applications to the selection of smoothing parameters," IEEE Trans. Med. Imag., vol. 18, pp. 293-205, Apr. 1999.

Qi, et al., "Fully 3D Bayesian image reconstruction for the EXAT EXACT HR+," IEEE Trans. Nucl. Sci, vol. 45, pp. 1096-1103, 1998.

Qi, et al., "High-resolution 3D Bayesian image reconstruction using the microPET small-animal scanner," Phys. Med. Biol., vol. 43, pp. 1001-1014, Apr. 1998.

Qi, et al., "Resolution and Noise Properties of MAP Reconstruction for Fully 3D PET," IEEE Trans. Med. Imag., vol. 19, pp. 493-506, May 2000.

Rogers, et al., "Localization of iodine-125-moP-Des-Met(14) bombesin (7-13)NH2 in ovarian carcinoma induced to express the gastrin releasing peptide receptor by adenoviral vector-mediated gene transfer," Journal of Nuclear Medicine, vol. 38, pp. 1221-1229, Aug. 1997.

Salvador, S. et al., "Improved EMCCD gamma camera performance by SiPM pre-localization", Physics in Medicine and Biology, vol. 57, pp. 7709-7724, Nov. 21, 2012.

Schellingerhout, et al., "Quantitation of HSV mass distribution in a rodent brain tumor model," Gene Therapy, vol. 7, pp. 1648-1655, Oct. 2000.

Somayajula, et al., "PET Image Reconstruction Using Information Theoretic Anatomical Priors," IEEE Trans Med Imag, vol. 30, pp. 537-549, 2010.

Tan, J.W. et al., "A Prototype MRI-Compatible Ultra-High Resolution SPECT for in Vivo Mice Brain Imaging," IEEE NSS/MIC Conference Record, 2008.

Tan, J.W. et al., "Experimental Study of the Response of 1-5 mm Thick CdTe/CZT Detectors inside Strong Magnetic Field," Nuclear Science Symposium Conference Record (NSS/MIC), pp. 3403-3409, 2010.

Van Der Have, et al., "U-SPECT-II: An Ultra-High-Resolution Device for Molecular Small-Animal Imaging," Journal of Nuclear Medicine, vol. 50, pp. 599-605, Apr. 1, 2009.

Volkel, et al., "Miniaturized imaging systems," Microelectronic Engineering, vol. 67-8, pp. 461-472, Jun. 2003.

Wackers, et al., "Technetium-9 9m Hexakis 2-Methoxyisobutyl Isonitrile:Human Biodistribution, Dosimetry, Safety, and Preliminary Comparison to Thaffium-201 for Myocardial Perfusion Imaging", J Nucl Med ; 30: 301-311, 1989.

Wagenaar, et al., "Development of MRI-compatible nuclear medicine imaging detectors", IEEE Nuclear Science Symp. Conf. Record vol. 3, 2013, 1825—8 pp.

Weissleder, et al., Molecular Imaging: Principles and Practice, 2010.

Wilson, et al., "A 10cm x 10cm CdTe Spectroscopic Imaging Detector based on the HEXITEC ASIC", Journal of Instrumentation, 10, 2015, 1-16.

Zalutsky, et al., "Radioiodinated Antibody Targeting of the HER-2neu Oncoprotein: Effects of Labeling Method on Cellular Processing and Tissue Distribution," Nuclear Medicine and Biology, vol. 26, pp. 781-790, Oct. 1999.

Zannoni, E. et al., "Design study for MRC-SPECT-II: The second generation MRI compatible SPECT system based on hyperspectral compound-eye gamma cameras", Journal of Nuclear Medicine May 2017, 58 (supplement 1). 1321, 2017.

Zannoni, E.M. et al., "Design study for MRC-SPECT-C: A MR-compatible cardiac SPECT system for simultaneous SPECT/MR cardiac imaging", SNMMI 2018 Annual Meeting, Philadelphia Convention Center, Jun. 25, 2018, University of Illinois at Urbana-Champaign, 19 pp.

Zinn, et al., "simultaneous evaluation of dual gene transfer to adherent cells by gamma-ray imaging," Nuclear Medicine and Biology, vol. 28, pp. 135-144, Feb. 2001.

Lai, Xiaochun et al., "System modeling and evaluation of a prototype inverted-compound eye gamma camera for the second generation MR compatible SPECT", Nuclear Inst. and Methods in Physics Research, A 954, Apr. 17, 2019, 6 pp.

"Larger version of figures corresponding to the figures in "Design Study for MRC-SPECT-II: A new generation of MR-Compatible SPECT System bioinspired by superposition compound eyes for

(56) References Cited

OTHER PUBLICATIONS ultrahigh resolution SPECT Imaging"", Journal of Nuclear Medicine May 2016, 57 (supplement 2) 91; 1 pp.

"Technetium TC 99M Sestamibi", Technetium TC 99M Sestamibi—FDA prescribing information, side effects and uses, https://www.drugs.com/pro/technetium-tc-99m-sestamibi.html, 19 pp., May 22, 2020.

Lai, Xiaochun et al., "Simulation study of the second-generation MR-compatible SPECT system based on the inverted compound-eye gamma camera design", Phys Med Biol. Author manuscript; available in PMC Feb. 12, 2019, 21 pp.

Zannoni, Elena M. et al., "Design Study of an Ultrahigh Resolution Brain SPECT System Using a Synthetic Compound-Eye Camera Design with Micro-Slit and Micro-Ring Apertures", IEEE Transactions on Medical Imaging, vol. xx, No. X, Feb. 2021, pp. 1-16.

Zannoni, Elena Maria et al., "Design Study for MRC-SPECT-II: A new generation of MR-Compatible SPECT System bioinspired by superposition compound eyes for ultrahigh resolution SPECT Imaging", Journal of Nuclear Medicine May 2016, 57 (supplement 2) 91; 3 pp.

\* cited by examiner

700

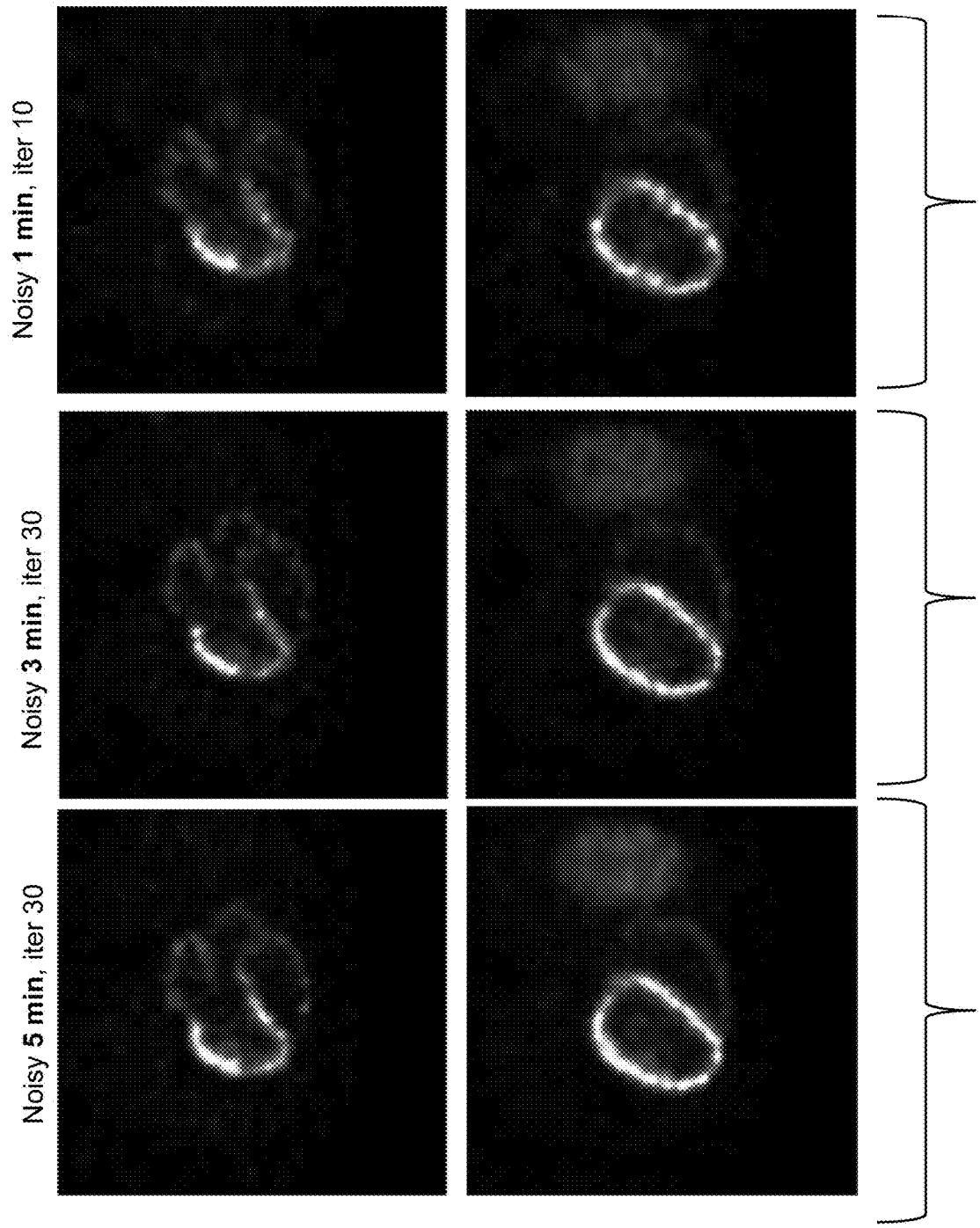

*(first row)* Tri-planar view of a digital rat brain phantom *(second row)* corresponding noisy image reconstruction (total activity 103 μCi, scanning time 60 min)

1600 the actual opening is narrow annulus rather than a round hole as in the pinhole case The projections of two resolution elements through a micro-ring aperture and a pinhole aperture.

Obtaining, by a first micro-camera-element comprising a first sensor portion and a first aperture structure, first imaging data, wherein the first aperture structure and the first sensor portion are located relative to each other such that the first aperture structure and the first sensor portion cooperate in obtaining the first imaging data, and wherein the first imaging data comprises a first spatial resolution and a first field-of-view
2002

Obtaining, by a second micro-camera-element comprising a second sensor portion and a second aperture structure, second imaging data, wherein the second aperture structure and the second sensor portion are located relative to each other such that the second aperture structure and the second sensor portion cooperate in obtaining the second imaging data, wherein the second imaging data comprises a second spatial resolution and a second field-of-view, wherein the first spatial resolution differs from the second spatial resolution, and wherein the first field-of-view differs from the second field-of-view
2004

Generating, by a processing system including a processor, combined imaging data, wherein the combined imaging data is based upon the first imaging data obtained by the first micro-camera-element and the second imaging data obtained by the second micro-camera-element
2006

GAMMA CAMERA FOR SPECT IMAGING AND ASSOCIATED METHODS

CROSS-REFERENCE TO RELATED APPLICATION(S)

The present application claims the benefit of priority to U.S. Provisional Patent Application No. 62/735,474, filed on Sep. 24, 2018, the disclosure of which is incorporated by reference herein in its entirety.

STATEMENT REGARDING FEDERALLY SPONSORED RESEARCH OR DEVELOPMENT

This invention was made with government support under R21 CA135736 and R01 EB019798 awarded by the National Institutes of Health. The government has certain rights in the invention.

FIELD OF THE DISCLOSURE

The subject disclosure relates generally to a gamma camera for SPECT imaging and associated methods. In one specific example, provided is an active collimation technique based on a compound eye gamma camera for SPECT imaging.

BACKGROUND

Single-Photon Emission Computed Tomography (SPECT) is an imaging technique using gamma rays to capture three-dimensional (3D) information of a target object. Conventional SPECT systems have associated therewith various aspects (e.g., sensitivity).

BRIEF DESCRIPTION OF THE DRAWINGS

Reference will now be made to the accompanying drawings, which are not necessarily drawn to scale, and wherein:

FIG. 3A shows an SCE camera panel 302 that comprises 10×10 camera elements. Each camera element consists of a square detector area and a single slit aperture as shown in FIG. 3A. FIG. 3B shows is a zoomed in drawing showing additional details (two slit apertures 304A, 304B are shown in this view).

FIG. 6A shows all the panels placed at the same distance from the center of the system; FIG. 6B shows when each panel is placed in a position according the body contour.

FIGS. 9A-9E show illustrations of simulated reconstructed images of the NCAT Heart Phantom acquired with an SCE camera design of the type of FIG. 8A according to an embodiment (these simulations are performed using a pinhole-opening (circular shape) and not a slit-opening (rectangular shape)).

FIG. 10 shows the single panel design, multiple panels are then combined to have a gamma camera according to various embodiments.

FIG. 12 shows multiple panels are then combined to have a gamma camera according to various embodiments.

FIG. 20 depicts an illustrative embodiment of a method in accordance with various aspects described herein.

DETAILED DESCRIPTION

Figure 1:
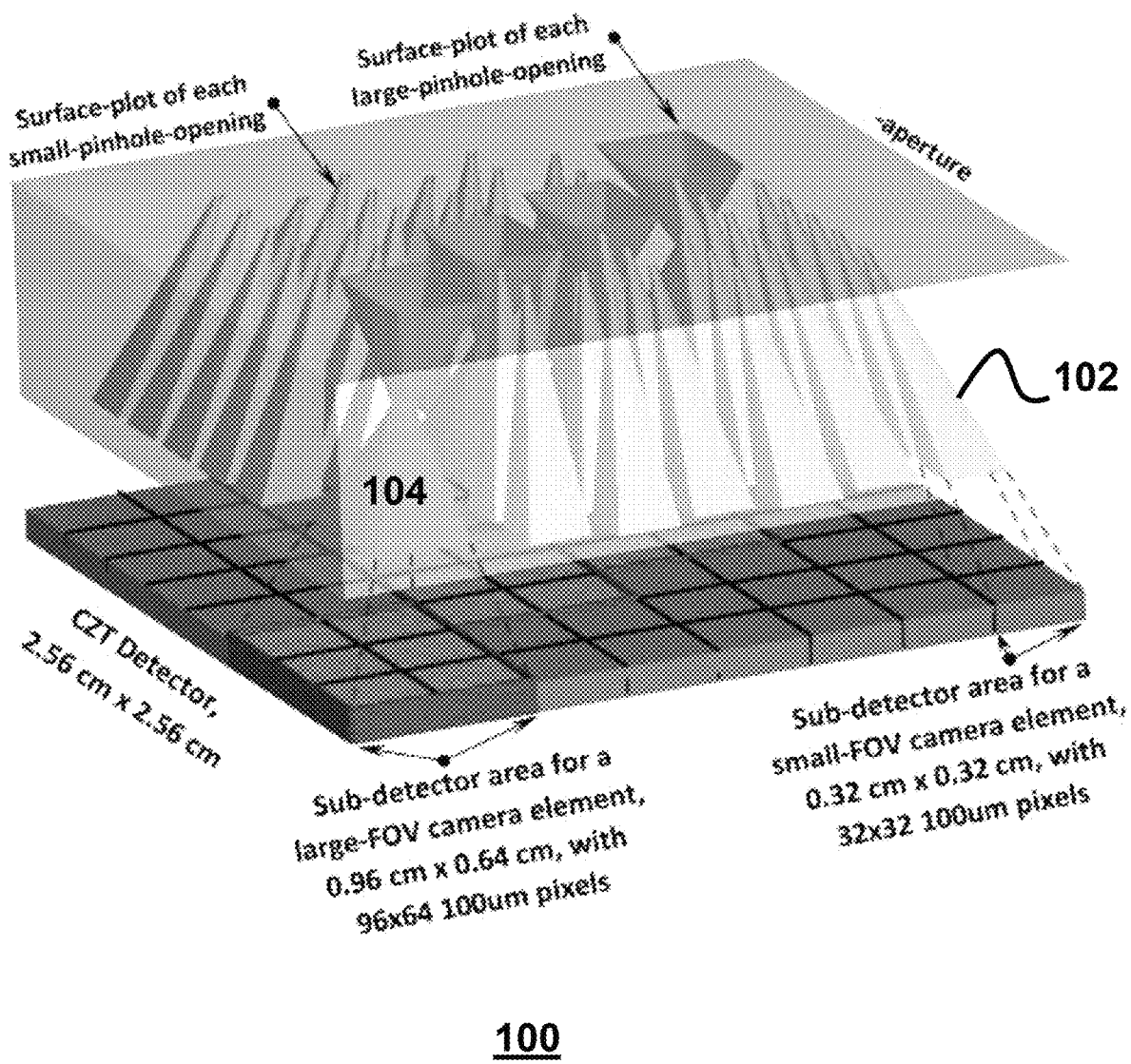
FIG. 1 shows an example design 100 of certain features of a synthetic compound eye (SCE) gamma camera according to an embodiment.

One embodiment of the subject disclosure provides a synthetic compound eye (SCE) gamma camera design as shown in FIG. 1. As seen in this figure, each gamma camera panel 100 of this embodiment comprises a large number of micro-camera-elements (MCE's). Each MCE comprises a small area of position-sensitive gamma ray detector and a collimation aperture that is, for example, a piece of heavy metal with an opening of various shapes, such as micro-slit, micro-ring, micro-star-shaped openings, or a pinhole, to allow gamma rays to pass through (and reach the corresponding detection area). Each MCE is, in effect, an independent micro-gamma camera, which has a limited open angle to collect photons emitted from a sub-region of a target object. A single camera system can include a large number of micro-camera-elements, wherein each micro-camera-element (of each type of micro-camera-element) is designed to offer a unique capability for collecting imaging information from the target object. Such a synthetic gamma camera design as described herein allows one to tailor the composition of different (types) of micro-camera-elements (MCE's), so that the combination of the pieces of imaging information collected with all of the individual micro-camera-elements can collectively offer a dramatically improved imaging performance. In various examples, one or more selections can be made from many different combinations of micro-camera-elements (MCE's), using pinhole, or other forms of irregular openings such as slit, ring and the like, each providing complementary information.

In one embodiment of a synthetic compound eye (SCE) gamma camera design described herein, there can be a large number (e.g., several hundred to several thousand) of micro-camera-elements (MCE's) surrounding the target object. Each MCE can use a slit opening, a ring opening, a pinhole (or the like) and be independently optimized to offer a specific imaging capability, such as offering a specific imaging resolution, geometrical efficiency, and/or angular coverage. In one embodiment, all of the MCE's in an SCE gamma camera panel can be jointly designed and optimized. While some or all of the MCE's can be designed differently, the information provided by these MCE's can be complementary and collectively offer a dramatically improved overall imaging performance (relative to a conventional gamma camera).

In one embodiment of a synthetic compound eye (SCE) gamma camera design described herein, a dramatically improved balance between imaging resolution and sensitivity is provided (relative to a conventional gamma camera). In one embodiment, multiple SCE gamma cameras can be used to construct a SPECT system, which has the potential of offering 10-100 times greater sensitivity (relative to a conventional SPECT system), while offering a comparable spatial resolution. This improved imaging capability could significantly improve the capability of SPECT imaging for many diagnosis applications, such as cardiac imaging and brain imaging.

In one embodiment, the gamma camera includes a very large number of micro-camera-elements (MCE's). Each MCE can include a small gamma-ray detection area and a collimation aperture that has one or more opening(s), such as a slit, ring, star-shaped, or pinhole to allow gamma rays to come through the openings and reach the respective detection area.

In one embodiment, a large number of micro-camera-elements (MCE's) can be individually optimized to offer specific imaging properties and/or imaging performance. In one embodiment, the MCE's are jointly optimized, so that each MCE offers complimentary imaging information (relative to one or more of the other MCE's).

As described herein, a benefit of certain MCE/camera/system embodiments is that by using a large number of micro-camera-elements to jointly sample the target object, one can achieve a dramatically improved balance between imaging resolution and sensitivity. For example, a clinical SPECT system based on one or more of the SCE gamma camera designs described herein could offer a sensitivity that is 1-2 orders of magnitude higher than a conventional SPECT system. This improvement could dramatically alter the current practice of clinical SPECT imaging, and potentially allow many new imaging procedures and diagnostic approaches that are not feasible today.

The present disclosure provides one or more improvements over U.S. Patent Application Publication No. 2014/0226784, which is hereby incorporated by reference.

Figure 2:
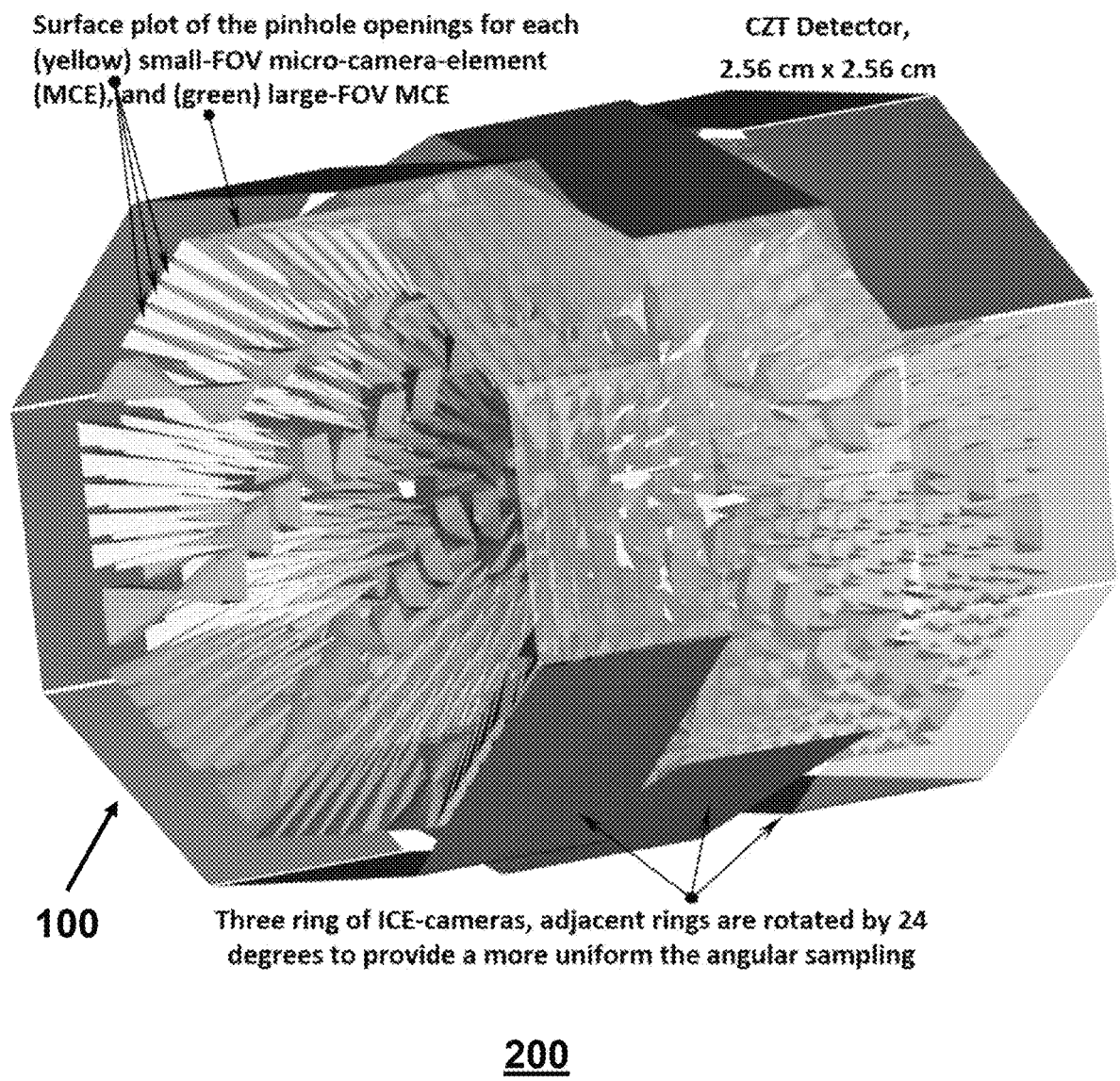
FIG. 2 shows an example design 200 of certain features of a synthetic compound eye gamma camera application in a SPECT system according to an embodiment (this figure shows a plurality of panels forming a plurality of rings (the panels are shown in an "exploded view); representative panel 100 of FIG. 1 is shown with a call-out number in this view).

Referring now to FIGS. 1 and 2, an example of one embodiment of a synthetic compound eye (SCE) gamma camera and its application to SPECT system design are shown. The synthetic compound eye gamma camera design (see gamma camera panel 100 of FIG. 1) incorporates a mixed array of two types of micro pinhole camera elements. For the first type of pinhole camera elements, each small detector area is coupled to a pinhole aperture whose open shape is depicted with the cone having the smaller base and top (generally shown in the drawing in a lighter shade—see representative call-out number 102). Each of these first type of camera elements has a small open angle but offering a very high spatial resolution. The second type of pinhole camera elements are depicted with the conical shaped pinhole openings with the larger base and top (generally shown in the drawing in a darker shade—see representative call-out number 104). These second type of pinholes cover the larger detector areas (as compared to the detector areas covered by the first type of pinholes in this example). Each of these second type of pinholes offers a wide angular coverage, and an excellent sensitivity owning to the use of large diameter pinholes. FIG. 2 shows a system 200 that includes a plurality of gamma camera panels (each of which is similar to the gamma camera panel 100 of FIG. 1).

Figures 3A, 3B:
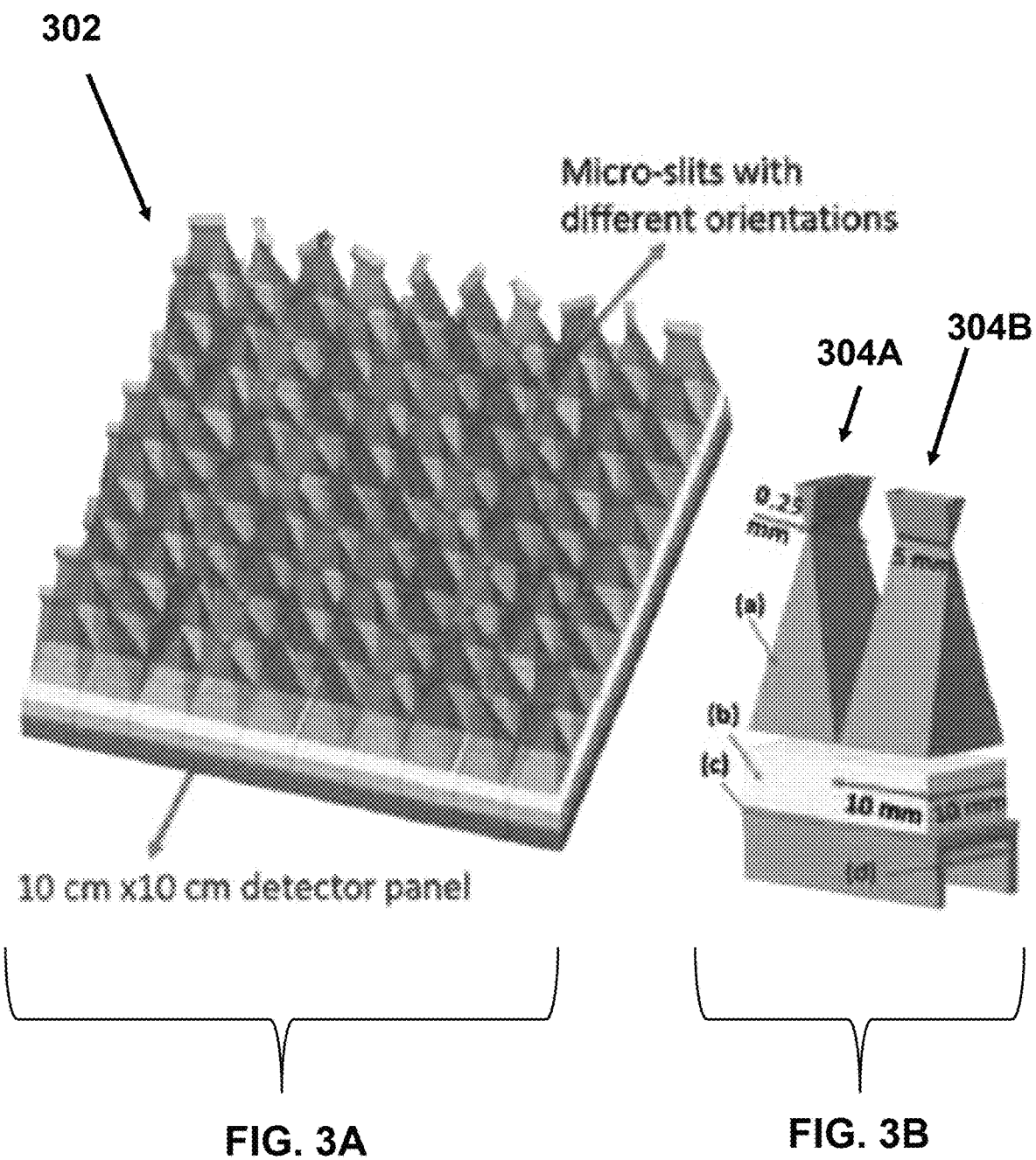
FIGS. 3A and 3B show example designs of certain features of a synthetic compound eye gamma camera according to various embodiments.

Referring now to FIGS. 3A and 3B, these show certain features of an SCE gamma camera according to various embodiments. As seen, SCE camera panel 302 includes an array of 10×10 camera elements. Each camera element includes a square detector area and a single slit aperture (see FIG. 3A). See, also, the zoomed-in drawing of micro-slit 304A and micro-slit 304B shown in FIG. 3B. FIG. 3A shows a possible design of an SCE camera. With this design, the orientations of various ones of the one-hundred slits can be randomly selected, so they each allow for a high-resolution sampling in the direction along the shorter side of the slit, but a low-resolution sampling in direction parallel to the longer side of the slit (in another example, all of the orientations are different from one another). Using this SCE camera design, a combination of high-resolution and low-resolution sampling from many different orientations can be achieved. This facilitates achieving an excellent spatial resolution at a sensitivity much higher than a conventional multiple pinhole camera design.

Figure 4:
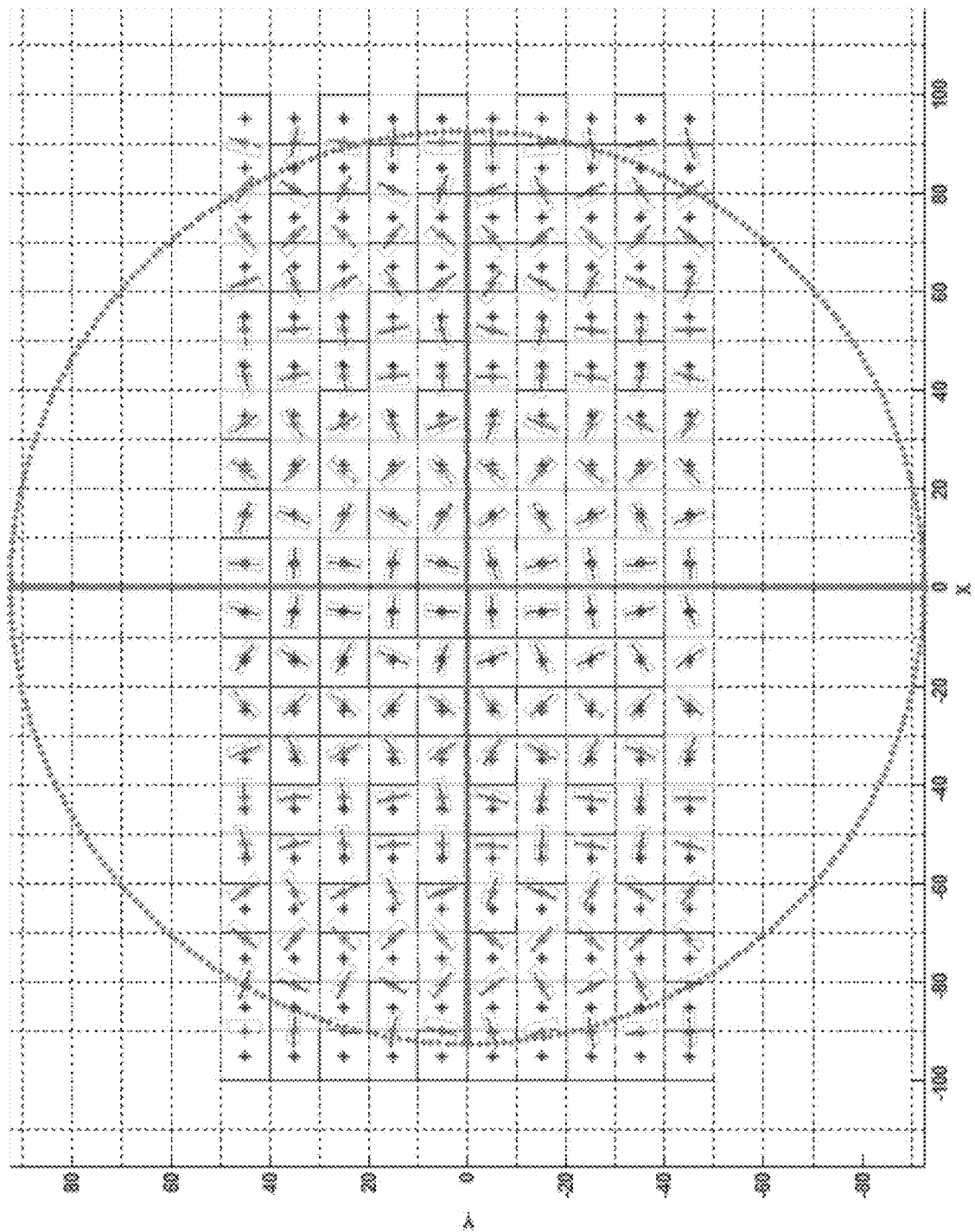
FIG. 4 shows a top view of 10×20 slit-openings in an SCE camera design similar to the type shown in FIG. 5 according to an embodiment.
Figure 5:
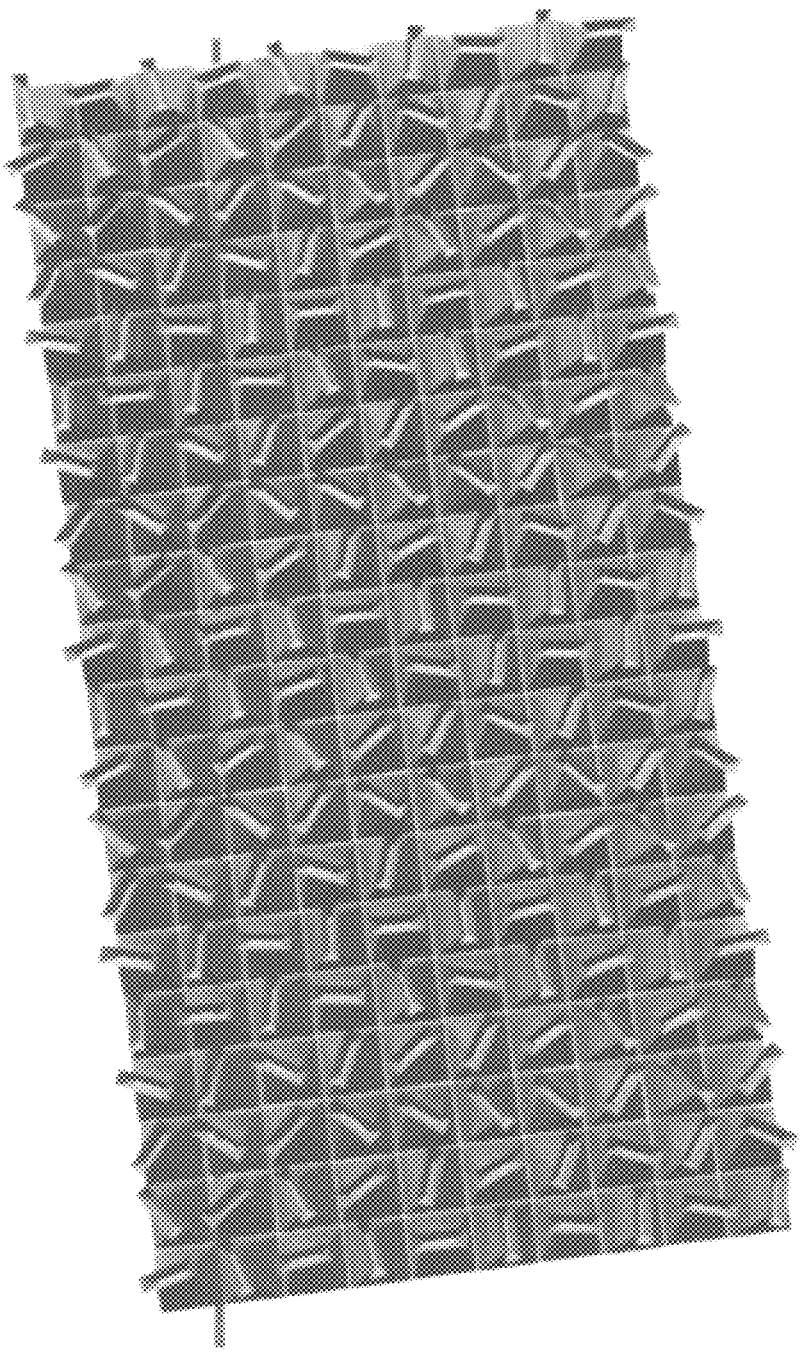
FIG. 5 shows a view of an aperture design according to an embodiment. Shown in this view are multiple micro-slit apertures for use in a synthetic compound eye (SCE) camera panel. This drawing is simplified to only depict the surfaces of all (10×20) slit-openings.

Referring now to FIG. 4, shown is a top view of 10×20 slit-openings in an SCE camera design similar to the type shown in FIG. 5 according to an embodiment (in another embodiment, there can be N×M slit openings and N and M could be determined by the user according to the need for providing differently sized field-of-view (FOV's)). This FIG. 4 shows the orientations of the slits in this embodiment, and it also illustrates that the SCE camera design of this embodiment is a collection of many micro-camera-elements with different imaging capabilities. Combining these micro-camera-elements into one camera panel facilitates achieving an improved imaging performance over a conventional gamma camera equipped with certain parallel hole collimators or certain multiple pinhole apertures.

As described herein, a synthetic compound eye (SCE) gamma camera design according to various embodiments uses a combination of multiple types of camera elements (each of which can have its own advantages and limitations). By tailoring each of the camera elements with appropriate characteristics, an object can be sampled (or imaged) in a unique way. In one example, each camera element can provide corresponding imaging information with a unique character (e.g., each camera element (or type of camera element) offering an ultrahigh spatial resolution, a wide angular sampling, or a very high sensitivity). When output data from these multiple camera elements are blended in an imaging system, the information being acquired with these different types of camera elements can be combined to offer a greatly improved image quality (relative to a conventional gamma camera typically equipped with a single type of camera element).

Various embodiments described herein provide for an apparatus having a plurality of camera panels, wherein each panel is positioned at a different viewing angle relative to a target object, and wherein each panel senses a plurality of two-dimensional (2D) projections from fractional views of a volume of interest of the target object at a viewing angle corresponding to the panel. Each panel can have a plurality of micro-camera elements (MCE's) for receiving gamma rays from the plurality of fractional views of the volume of interest of the target object at the viewing angle corresponding to the camera panel, each individual MCE can have a pinhole, micro-slit, micro-ring (or other shaped aperture), and each individual opening can be independently optimized and tailored to offer a specific imaging performance. Further, within each micro-camera-element, there can also be one or more imaging sensors that is aligned with the corresponding opening. A synthetic compound eye camera has a plurality of MCE's for generating the plurality of 2D projections from the fractional views of the volume of interest of the target object at the viewing angle corresponding to the panel. Each individual sensor (or group of sensors) can be independently optimized and tailored (e.g., in conjunction with a corresponding aperture) to offer a specific imaging performance. The apparatus can further utilize a memory to store instructions, and a processor coupled to the plurality of panels and the memory to execute the instructions and perform operations including receiving, from each panel, the plurality of 2D projections of the fractional views of the volume of interest of the target object at the viewing angle corresponding to the panel, and generating, from the 2D projections of the fractional views of the volume of interest provided by each panel, a three-dimensional (3D) image of a 3D section of the target object.

A synthetic compound eye (SCE) gamma camera according to various embodiments can be constructed with position-sensitive gamma ray detectors and special collimation apertures. Such a design can use ultrahigh resolution imaging detectors, such as semiconductor pixel detectors or high resolution scintillation detectors (see S. Salvador, M. A. N. Korevaar, J. W. T. Heemskerk, R. Kreuger, J. Huizenga, S. Seifert, et al., "Improved EMCCD gamma camera performance by SiPM pre-localization," Physics in Medicine and Biology, vol. 57, pp. 7709-7724, Nov. 21, 2012; and L. J. Meng, "An intensified EMCCD camera for low energy gamma ray imaging applications," IEEE Transactions on Nuclear Science, vol. 53, pp. 2376-2384, August 2006).

In various embodiments, the projection data collected by all the micro-camera-elements (MCEs) can be combined to form 3-D images of the target object volume using one or more of several possible image reconstruction techniques, such as maximum likelihood (ML), penalized maximum likelihood (PML) or equivalently maximum a posteriori (MAP) algorithms. The discussion below provides a brief conceptual description of one or more of these techniques.

Reference will now be made to examples of image processing according to various embodiments, as follows:

Let the target object volume being imaged be represented by a series of unknown pixel intensities $x=[x_1, x_2, \ldots, x_N]$ that are underlying the measured projection data $y=[y_1, y_2, \ldots, y_M]$. The mapping from x to y is governed by a probability distribution function, pr(y;x). For emission tomography, y can be approximated as a series of independent random Poisson variables, whose expectations are given by $$\bar{y}_m = E[y_m] = \sum_{y_m=0}^{\infty} y_m \cdot p_r(y_m;x) \quad (1)$$

$$m = 1, \ldots, M,$$

or by the following discrete transform $$\bar{y}=T\bar{p},$$

and $$\bar{p}=A\cdot x, \quad (2)$$

E[•] denotes the expectation operator. T is the total imaging time. p is the mean projection with a unit imaging time. A is a M×N matrix that represents the discretized system response function (SRF). If it is assumed that the SRF is free of systematic error, the log-likelihood function of the measured data y can be given by $$L(x, y) = \log p_r(y; x) = \sum_m y_m \log \bar{y}_m - \bar{y}_m, \text{ and} \quad (3)$$

$$\bar{y}_m = T \cdot \sum_m a_{mn} x_n, \quad (4)$$

where $a_{mn}$ is an element of A. This formula provides the probability of a gamma ray emitted at the n'th source voxel being detected by the m'th detector pixel within a unit imaging time. The underlying image function may be reconstructed as $$\begin{cases} \hat{x}_{PML}(y) = \underset{x \geq 0}{\operatorname{argmax}}[L(x, y) - \beta \cdot R(x)] \\ \text{and then} \\ \hat{x}_{PF-PML} = F_{filter} \cdot \hat{x}_{PML}(y) \end{cases} \quad (5)$$

where R(x) is a scalar function that selectively penalizes certain undesired features in reconstructed images. β is a parameter that controls the degree of regularization. $F_{filter}$ is an N×N matrix that represents the post-filtering operator.

Reference will now be made to a synthetic compound eye (SCE) gamma camera design according to an embodiment. Reference will also be made to a SPECT system (utilizing such a synthetic compound eye gamma camera design) according to various embodiments. In one example, this SPECT system assists or facilitates with detection, quantitation, and other diagnostic function(s). In one example, the SPECT system delivers several desired imaging properties at the same time. These imaging properties can include covering a sufficient field-of-view (FOV) and offering adequate spatial resolution and sensitivity, etc.

In this regard, it is noted that the system design criteria for achieving these imaging properties are often contradicting to each other, which typically has made it difficult to design a gamma camera that is optimized on all these aspects at the same time. As described herein, an SCE gamma camera according to various embodiments is constructed with a large number of micro-camera-elements (MCE's). Each of the MCEs can be optimized individually (e.g., some for an ultrahigh spatial resolution, some for a wide FOV, and some for an improved sensitivity).

As described herein, SCE gamma camera and SPECT system designs of various embodiments can be based on the construction of a SPECT system as a collection of a very large number of sub-imaging-systems that are defined as micro-camera-elements (MCE's). Each one or each group of these MCE's could be tailored individually to offer different properties for sampling the imaging signals from the object that is being imaged. This configuration allows for a much greater flexibility (i.e., a much larger number of degrees of freedom) to optimize the physical design of the imaging system to meet the various imaging performance targets.

As described herein, certain design and operational attributes according to various embodiments can be as follows: (1) A synthetic compound-eye (SCE) gamma camera that includes a large number of micro-camera-elements (MCE's). (2) Each MCE of these embodiments includes a small gamma-ray imaging detector and a collimation aperture that has one or more pinhole(s), slit(s), ring(s), or other forms of openings; each MCE of these embodiments is a complete and miniaturized gamma camera. (3) The physical design of each MCE of these embodiments is tailored individually to offer a specific set of sampling/imaging properties. (4) An SCE gamma camera of these embodiments includes multiple groups of MCE's; each group of MCE's of these embodiments is designed to offer a specific set of imaging properties/capabilities that can be chosen to be complementary to the imaging properties/capabilities offered by other groups. (5) There can be a large number of MCE's within an SCE camera; this allows each group to have a sufficient number of MCE's, and therefore, the specific imaging properties/capabilities (that a given group of MCEs is designed to offer) can have a sufficient influence on the final image quality attainable with the entire SCE-based SPECT system of these embodiments. (6) The data acquired with all the MCE's in the SCE gamma camera of these embodiments (or by a SPECT system that includes multiple SCE gamma cameras) can be combined with image reconstruction algorithm(s) to produce 3-D tomographic images of the object that is being imaged.

Figure 7:
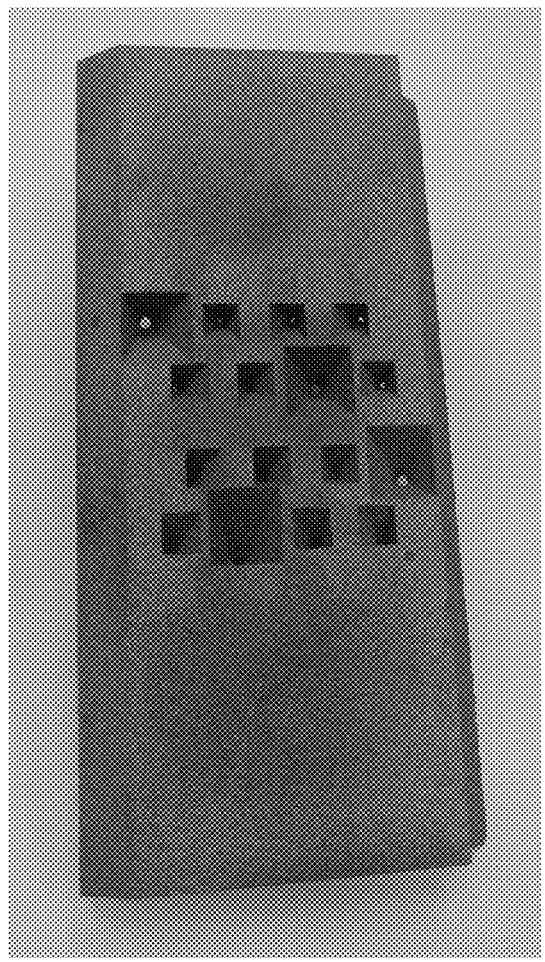
FIG. 7 shows an example of a plurality of apertures 700 produced using rapid additive manufacturing with selective laser melting of tungsten powder according to an embodiment.
Figure 8A:
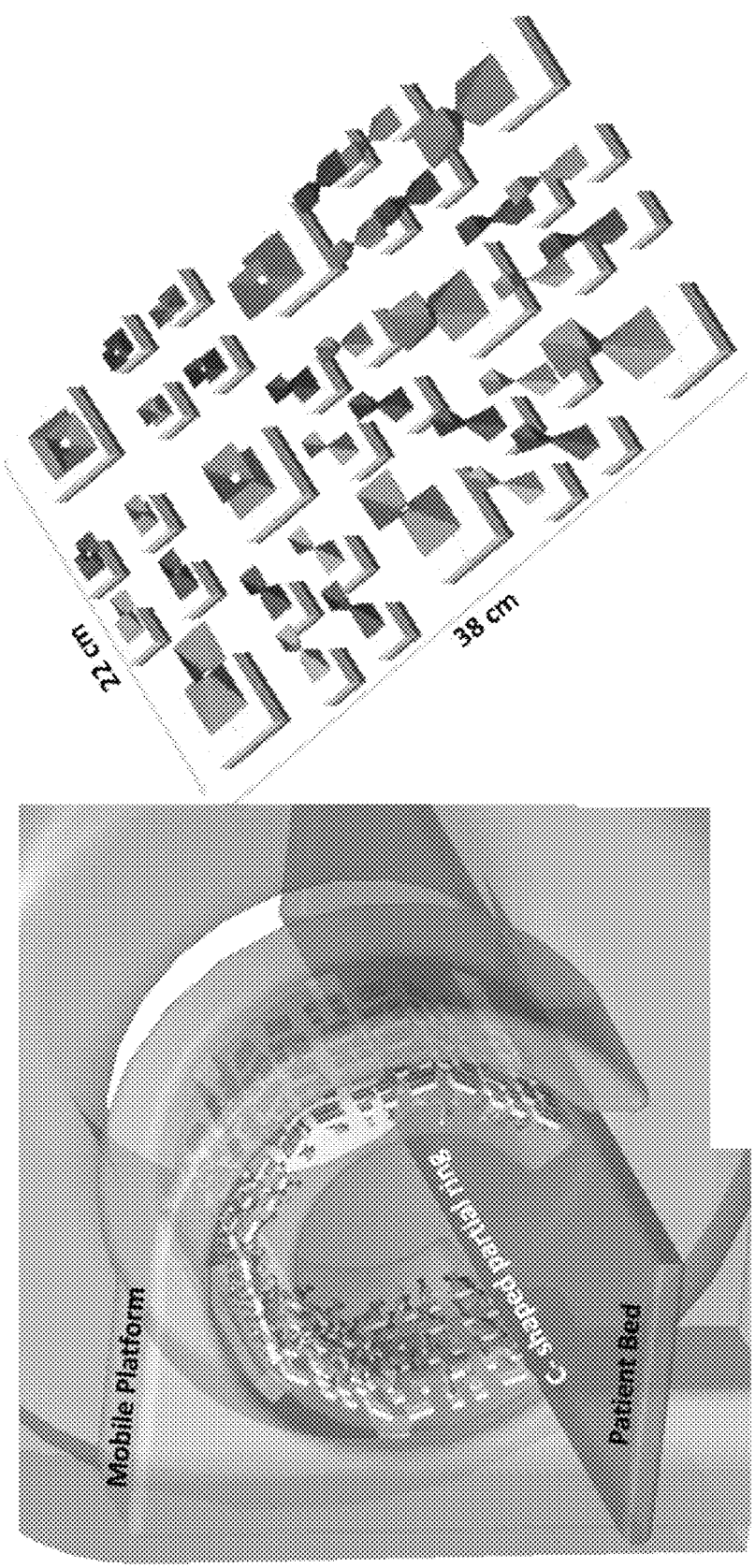
FIG. 8A shows example designs of certain features of a synthetic compound eye gamma camera according to various embodiments. The view on the left shows a system and the view on the right shows certain details.

Referring now to FIGS. 1 and 2, as well as to FIG. 7 and FIG. 8A, a synthetic compound eye (SCE) gamma camera according to an embodiment is shown. As seen in these figures, a synthetic compound eye (SCE) camera panel of this embodiment can comprise dense 2D arrays of MCE's in which different types of independent MCEs are distributed (in one example, such independent MCEs can be distributed with different density). In this embodiment, the SCE gamma camera is a 3D arrangement of several SCE camera modules. With this design, it is possible to retain the intrinsic benefit of ultrahigh sensitivity, and have more flexible imaging performance to suit different imaging applications.

As described herein, various embodiments provide a SPECT system and/or a synthetic compound eye gamma camera that include a large number of micro-camera-elements. One embodiment provides for the design and optimization of each micro-camera-element individually, so that the combination of all individual micro-camera-elements would offer an improved imaging performance that is not achievable with various conventional gamma camera and SPECT systems.

Figures 6A, 6B:
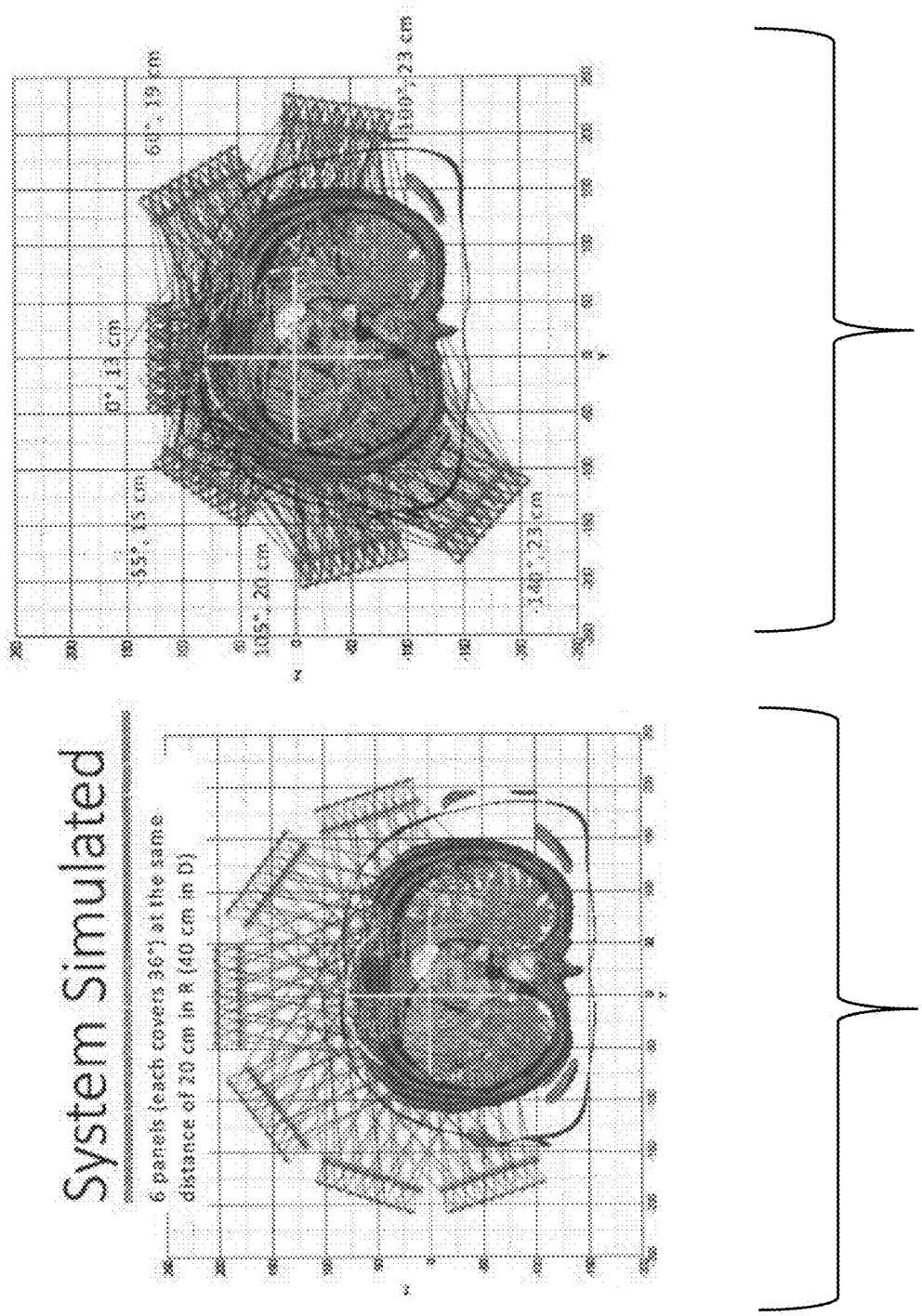
FIGS. 6A and 6B show the cross-sectional views of two simulated designs of a cardiac SPECT system according to an embodiment. The cardiac SPECT system of this embodiment includes 6 SCE camera panels. Each panel of this embodiment is 10 cm×20 cm in size and is designed as a collection of 10×20 micro-camera-elements. Each micro-camera-element of this embodiment is equipped with a detector area of 1 cm×1 cm coupled to a single slit aperture. In these figures.

Referring now once again to FIGS. 6A and 6B, shown are the cross-sectional views of two simulated designs of a cardiac SPECT system according to an embodiment. The cardiac SPECT system of this embodiment includes 6 SCE camera panels. Each panel of this embodiment is 10 cm×20 cm in size and is designed as a collection of 10×20 micro-camera-elements. Each micro-camera-element of this embodiment is equipped with a detector area of 1 cm×1 cm coupled to a single slit aperture. In these figures, FIG. 6A shows all the panels placed at the same distance from the center of the system; FIG. 6B shows when each panel is placed in a position according the body contour.

Figure 8B:
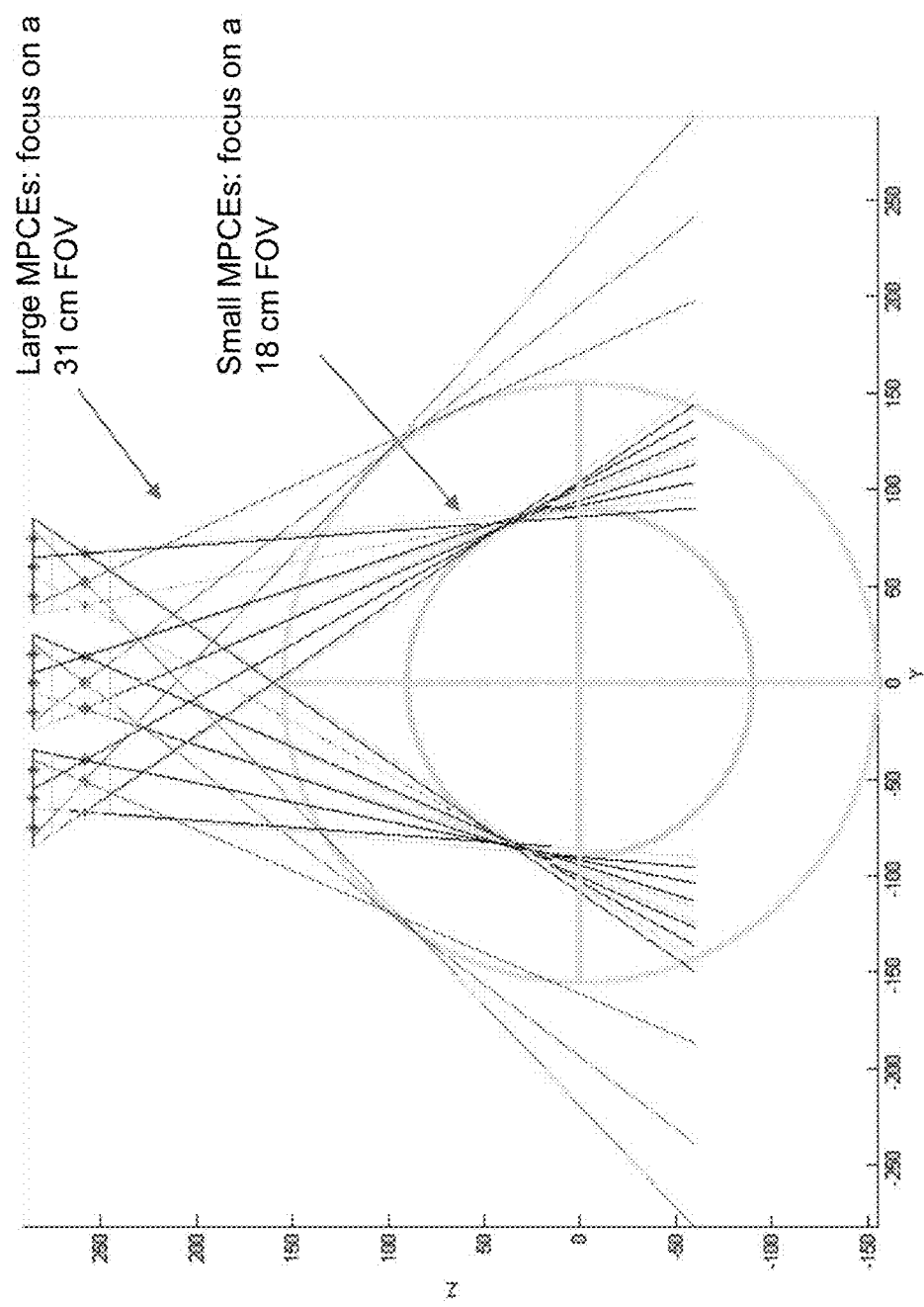
FIGS. 8B and 8C show illustrations of the cross sectional coverage offered by an SCE camera design of the type of FIG. 8A according to an embodiment.
Figure 8C:
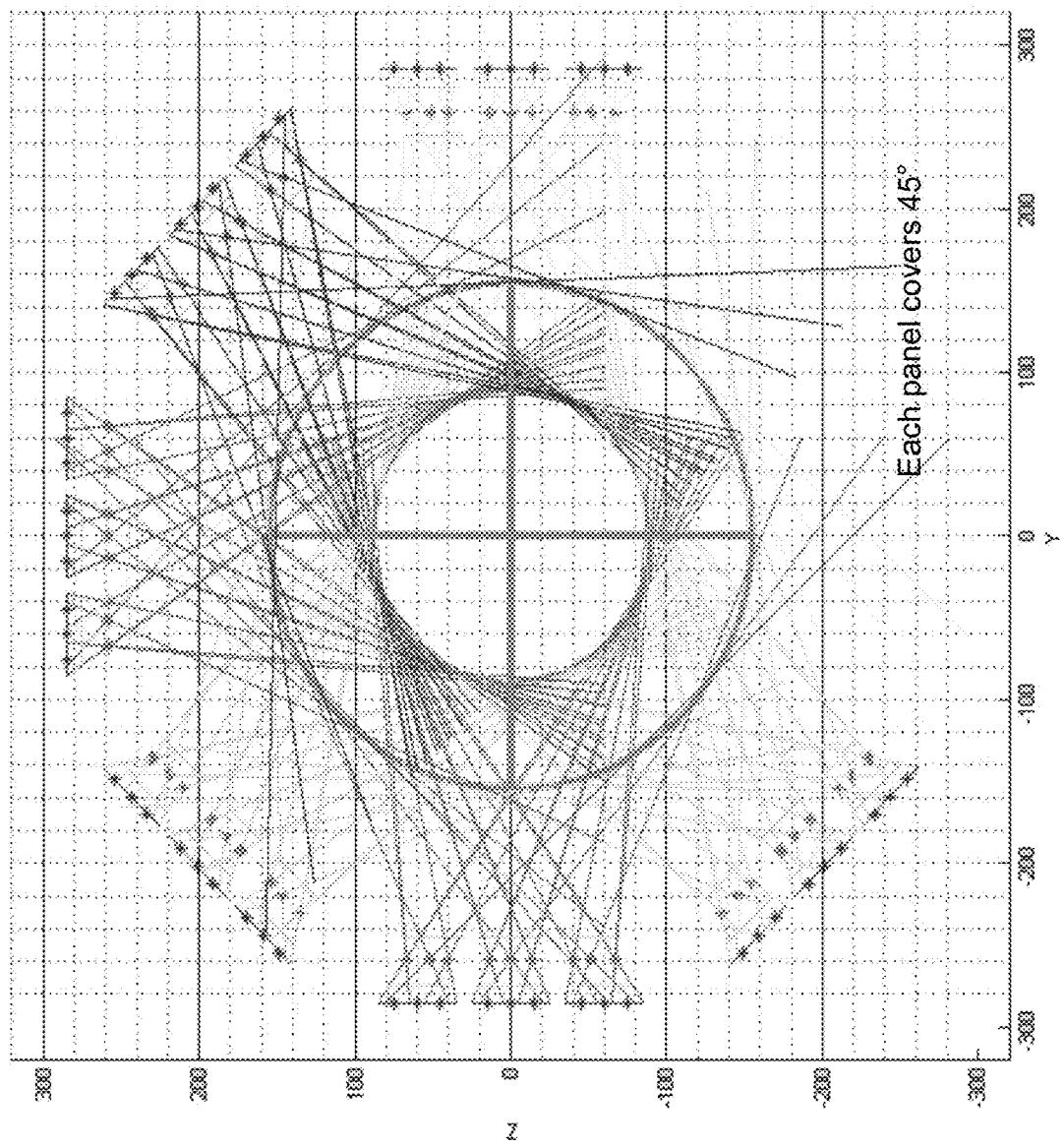
Figures 9A, 9B:
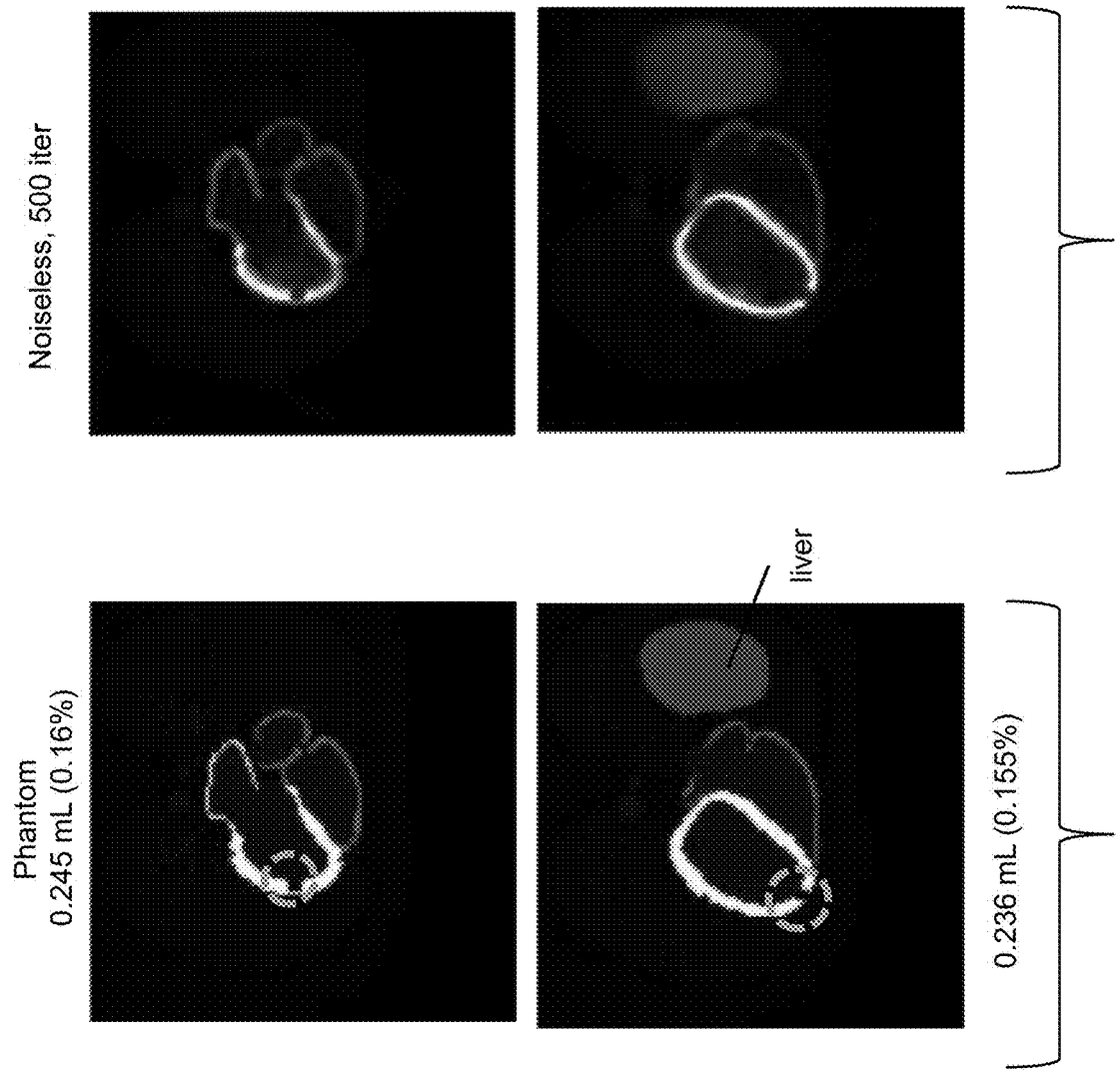

Referring now to FIG. 8A, shown are example designs of certain features of a synthetic compound eye gamma camera according to various embodiments. The view on the left shows a system and the view on the right shows certain details Referring now to FIGS. 8B and 8C, shown are illustrations of the cross sectional coverage offered by an SCE camera design of the type of FIG. 8.

Referring now to FIGS. 9A-9E shown are illustrations of simulated reconstructed images of the NCAT Heart Phantom acquired with an SCE camera design of the type of FIG. 8A. In these FIGS. 9A-9E, the simulation conditions/parameters are the following: (a) heart region (128×128×128 voxels of 2×2×2 $mm^3$) from a human NCAT phantom; (b) two small cardiac defects of 0.245 and 0.236 mL, respectively; (c) injected dose of 13.2 MBq/kg in a 70 kg patient (25 mCi); (d) realistic activity distribution in various organs according to the Tc99m Sestamibi pharmacokinetics (see Munch G I, Neverve J, Matsunari I, Schroter G, Schwaiger M., "Myocardial technetium-99m-tetrofosmin and technetium-99m-sestamibi kinetics in normal subjects and patients with coronary artery disease." Journal of Nuclear Medicine, 1997; see also Technetium T C 99M Sestamibi—FDA prescribing information, side effects and uses. (2018, June 1). Retrieved Jun. 17, 2019, from https://www.drugs.com/pro/technetium-tc-99m-sestamibi.html; see also Wackers F J, Berman D S, Maddahi J, et al. (1989) Technetium-99m hexakis 2-methoxyisobutyl isonitrile: human biodistribution, dosimetry, safety, and preliminary comparison to thallium-201 for myocardial perfusion imaging. J Nucl Med; 30: 301-311) (e) myocardium uptake fraction of 1.2% at rest 5 minutes after injection; (f) iterative image reconstruction method (3D OSEM) used for reconstruction.

Figure 10:
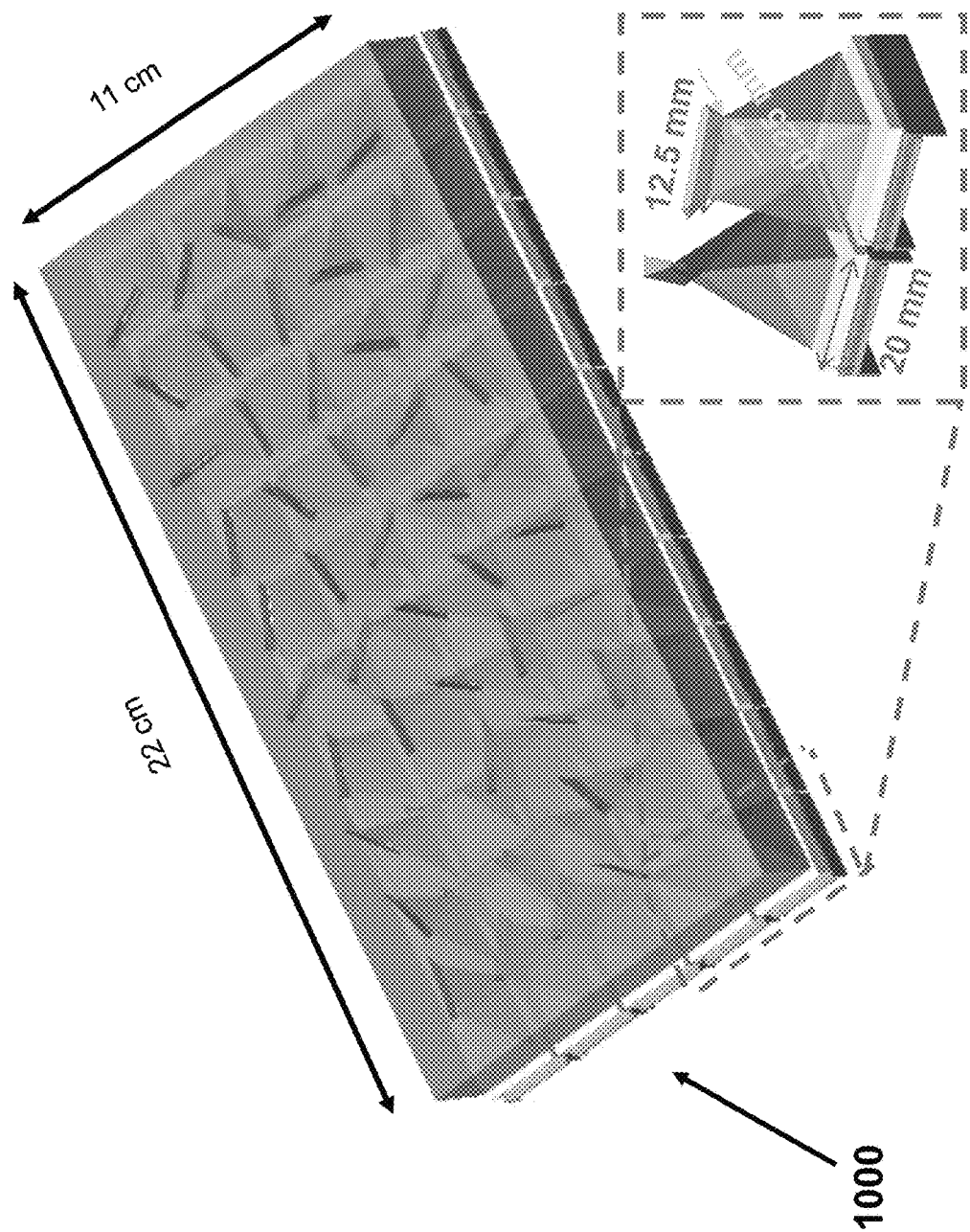
FIG. 10 shows a synthetic compound eye gamma camera design 1000 according to an embodiment (the inset shows details of certain aspects of the panel). This

Referring now to FIG. 10, a synthetic compound eye gamma camera design according to an embodiment is shown (the inset shows details of certain aspects of the panel 1000). As seen, this embodiment provides for micro-slit compound-eye aperture. In this regard, it is noted that while pinholes are typically used apertures in preclinical and clinical SPECT imaging, their open-fraction is limited by the diameter of the pinhole. In various embodiments, the micro-slit aperture offers two different dimensions with different functions: (a) the narrow width of the slit allows for a high spatial resolution in the final images; (b) the long dimension of the slit increases the overall open-fraction and an extended FOV. In one embodiment, to assure a uniform spatial resolution in the FOV, each micro-slit can have a proper orientation in the aperture plane. In one embodiment, the aperture design assures that the projection from the micro-slit is properly confined inside the corresponding sensor surface (see, also, FIGS. 11A-11C and 12).

Figures 11A, 11B, 11C:
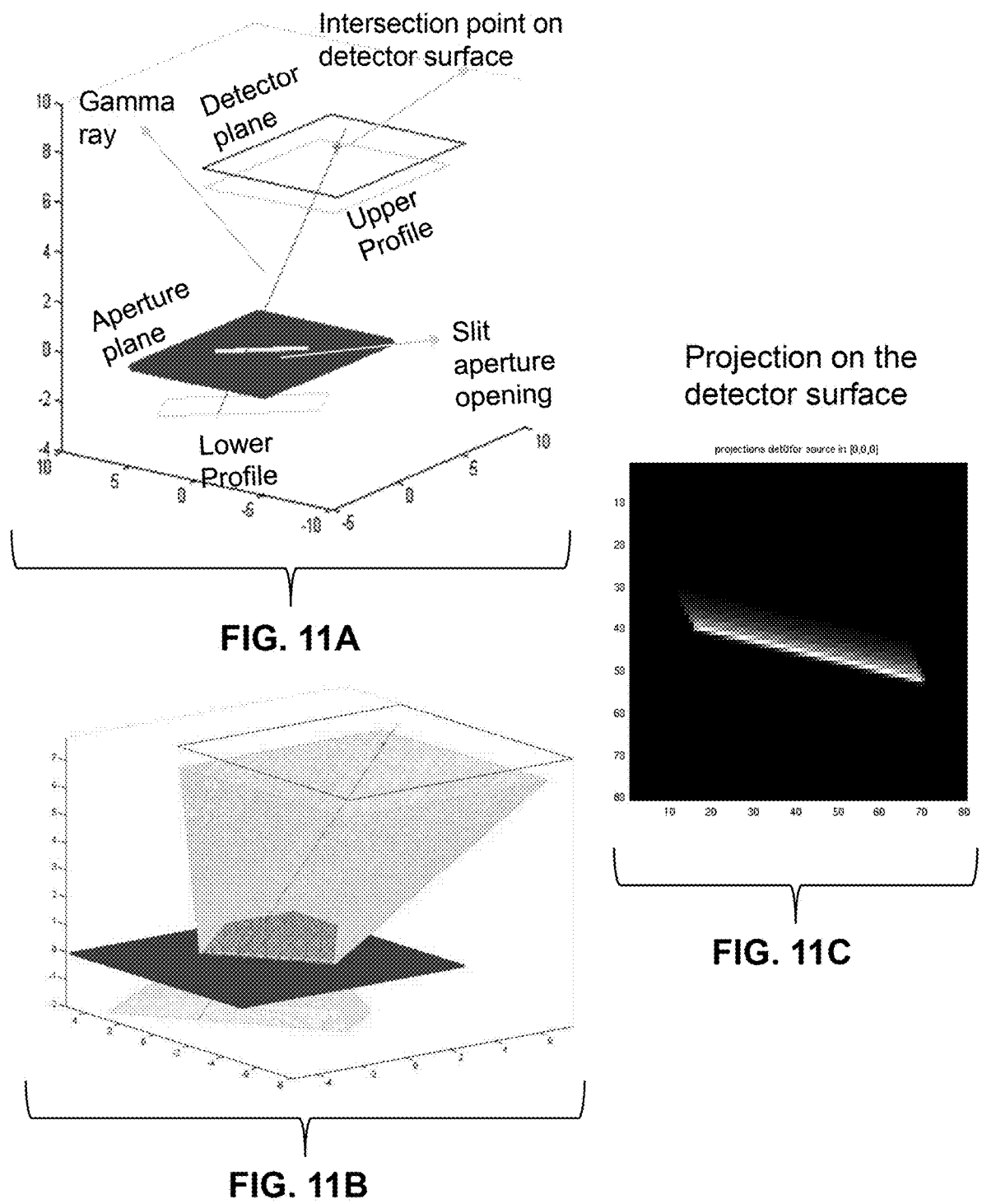
FIGS. 11A-11C show illustrations related to a single micro-slit aperture (see, e.g., one of the micro-slit apertures shown in the inset of FIG. 10) according to an embodiment.

Referring now to FIGS. 11A-11C, illustrations related to a single micro-slip aperture (see one of the micro-slit apertures shown in the inset of FIG. 10) according to an embodiment are shown.

Figure 12:
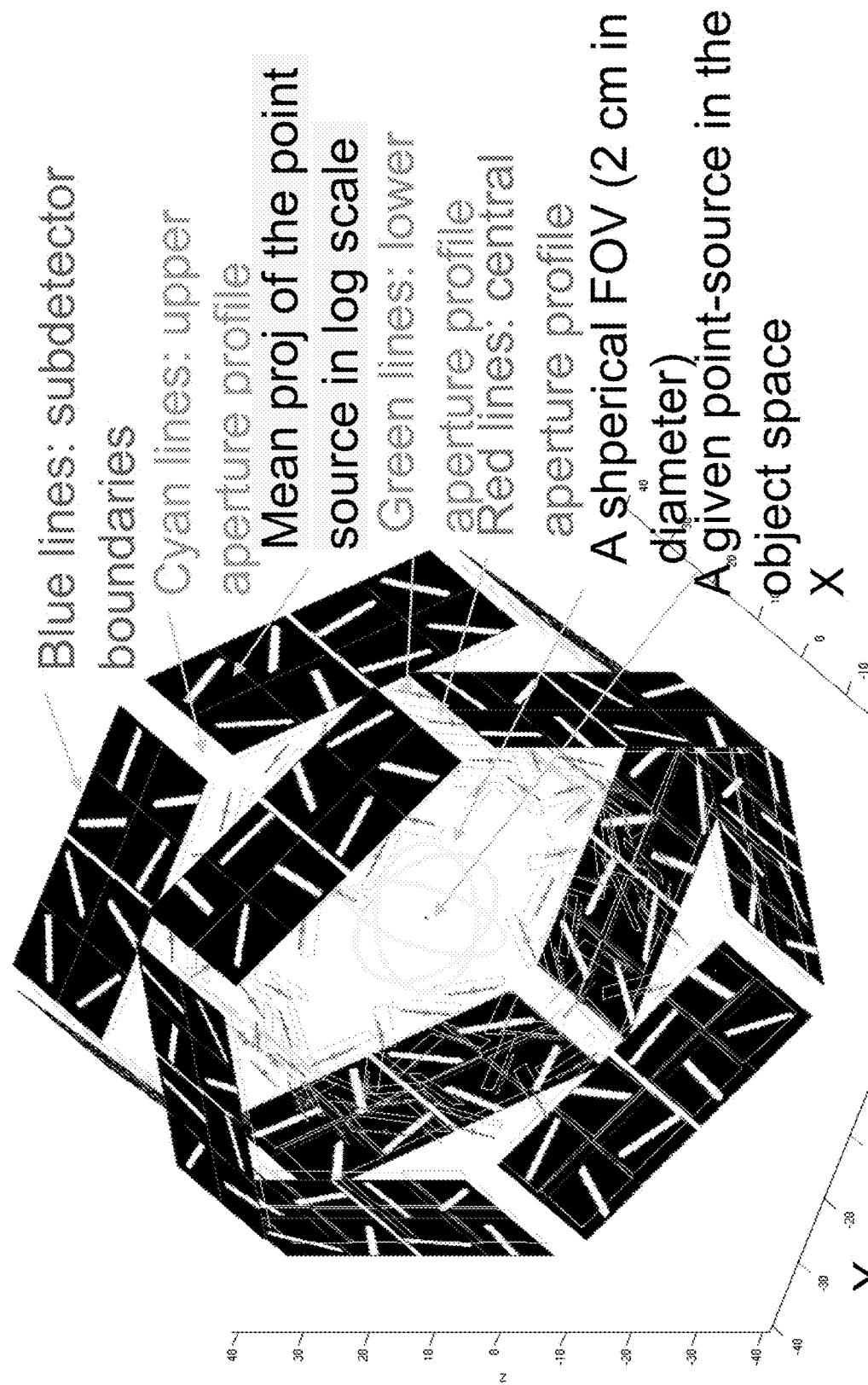
FIG. 12 shows visualization of a synthetic compound eye gamma camera design including the slit projections according to an embodiment.

Referring now to FIG. 12, visualization of slit projections according to an embodiment is shown.

Figure 13A:
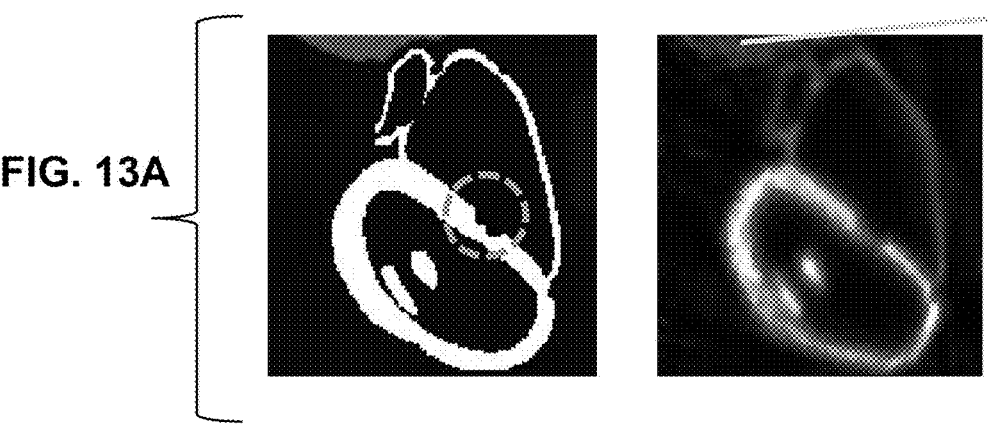
FIGS. 13A-13C show illustrations of certain results obtained with a cardiac SPECT system using slit apertures of the type shown in FIG. 5 equipped with six camera-panels according to an embodiment. In these figures, heart phantom simulations are shown. In these figures, the heart phantom used is the same as FIGS. 9A-9E; the simulations of FIGS. 13A-13C are performed using a slit opening (rectangular shape) and not a pinhole-opening (circular shape) such as in FIGS. 9A-9E.
Figure 13B:
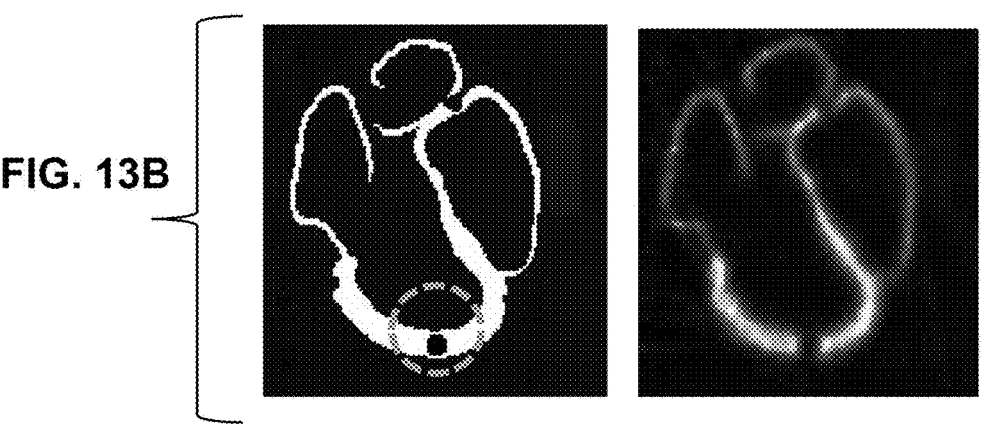
Figure 13C:
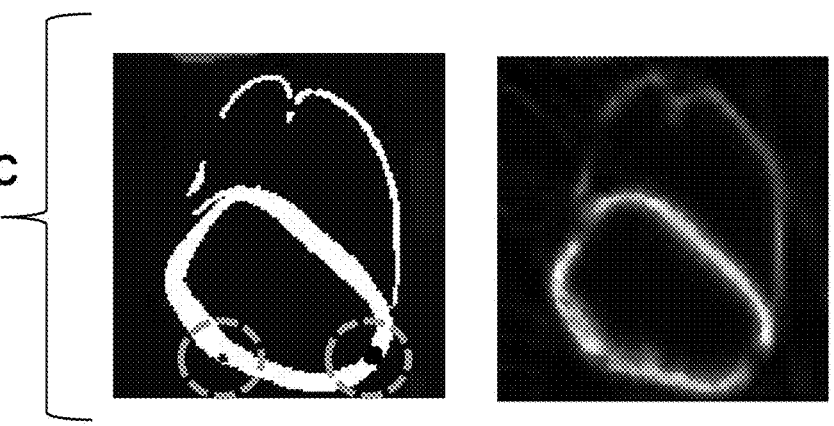

Referring now to FIGS. 13A-13C, shown are illustrations of certain results obtained with a cardiac SPECT system using slit apertures of the type shown in FIG. 5 equipped with six camera panels according to an embodiment. In these figures, heart phantom simulations with the following simulation parameters and conditions are shown: (a) heart region (comprising of 128×128×128 voxels of 1 $mm^3$ in the example shown) from a human NCAT phantom; (b) small cardiac defects (one transmural); (c) injected dose of 3 MBq/kg in a standard 70 kg patient; (d) myocardium uptake fraction of 1.2% 5 minutes after injection (see Syed Sajid Husain, Myocardial Perfusion Imaging Protocols: Is There an Ideal Protocol?, J. Nucl. Med. Tehnol. March 2007 vol. 35 no. 1 3-9); (e) acquisition 30 min. In these figures, the heart phantom used is the same as FIGS. 9A-9E; the simulations of FIGS. 13A-13C are performed using a slit opening (rectangular shape) and not a pinhole-opening (circular shape) such as in FIGS. 9A-9E.

Figure 14:
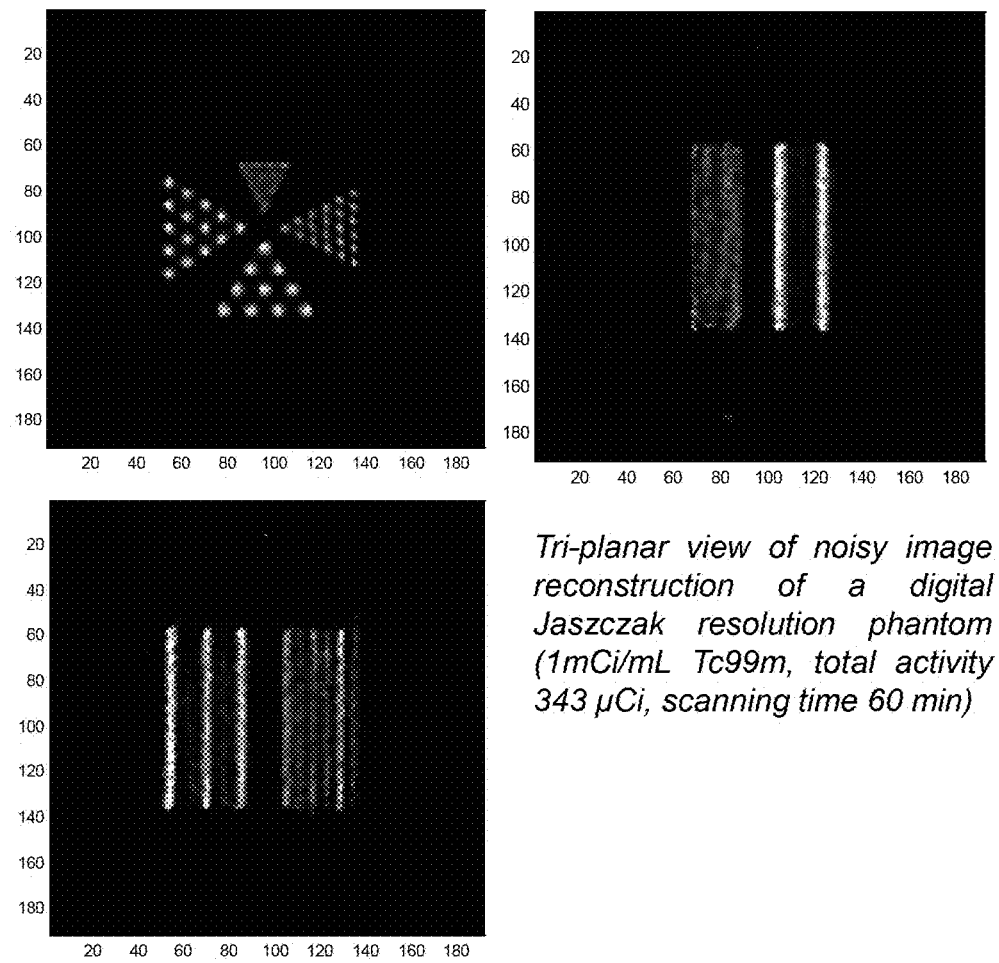
FIG. 14 shows illustrations of certain results with a small-animal SPECT system/geometry equipped with multiple micro-slit apertures of the type shown in FIG. 12 equipped with the multiple-slit apertures of the type show in FIG. 11A-11B according to an embodiment. In these figures, the noisy reconstruction images of a resolution phantom are shown (1 mCi/mL Tc99m, total activity 343 µCi, scanning time 60 min).

Referring now to FIG. 14, shown are illustrations of certain results obtained with a small animal SPECT system/geometry of the type shown in FIG. 12 equipped with the multiple-slit apertures of the type show in FIG. 11A-B according to an embodiment. These figures show a tri-planar view of noisy image reconstruction of a digital Jaszczak resolution phantom (1 mCi/mL Tc99m, total activity 343 µCi, scanning time 60 min).

Figure 15:
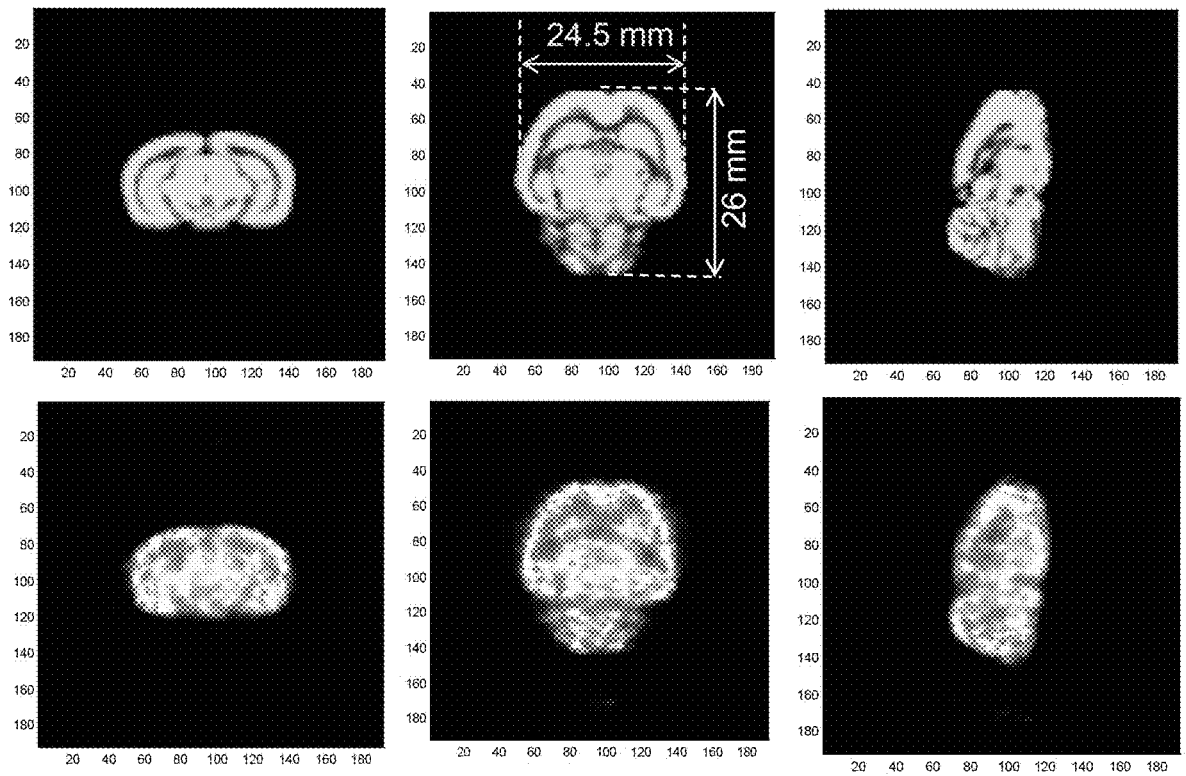
FIG. 15 shows illustrations of certain results with a small-animal SPECT system/geometry equipped with multiple micro-slit apertures according to an embodiment. In these figures, a rat brain phantom is shown (in this figure, shown is: tri-planar view of noisy image reconstruction of a digital rat brain phantom (Tc99m, total activity 103 µCi scanning time 60 min)). The width of the brain in the middle image is 24.5 mm and the height is 26 mm.

Referring now to FIG. 15, shown are illustrations of certain results with a small animal SPECT system/geometry of the type shown in FIG. 12 with multiple micro-slit apertures according to an embodiment. Reconstructed images of a rat brain phantom are shown. In these figures the first row shows a tri-planar view of a digital rat brain phantom (see Beekman F J, Vastenhouw B, van der Wilt G, Vervloet M, Visscher R, Booij J, Gerrits M, Ji C, Ramakers R and van der Have F 2009 3D rat brain phantom for high-resolution molecular imaging Proc. IEEE 97 1997-2005) and the second row shows corresponding noisy image reconstruction (total activity 103 µCi, scanning time 60 min).

Figure 16:
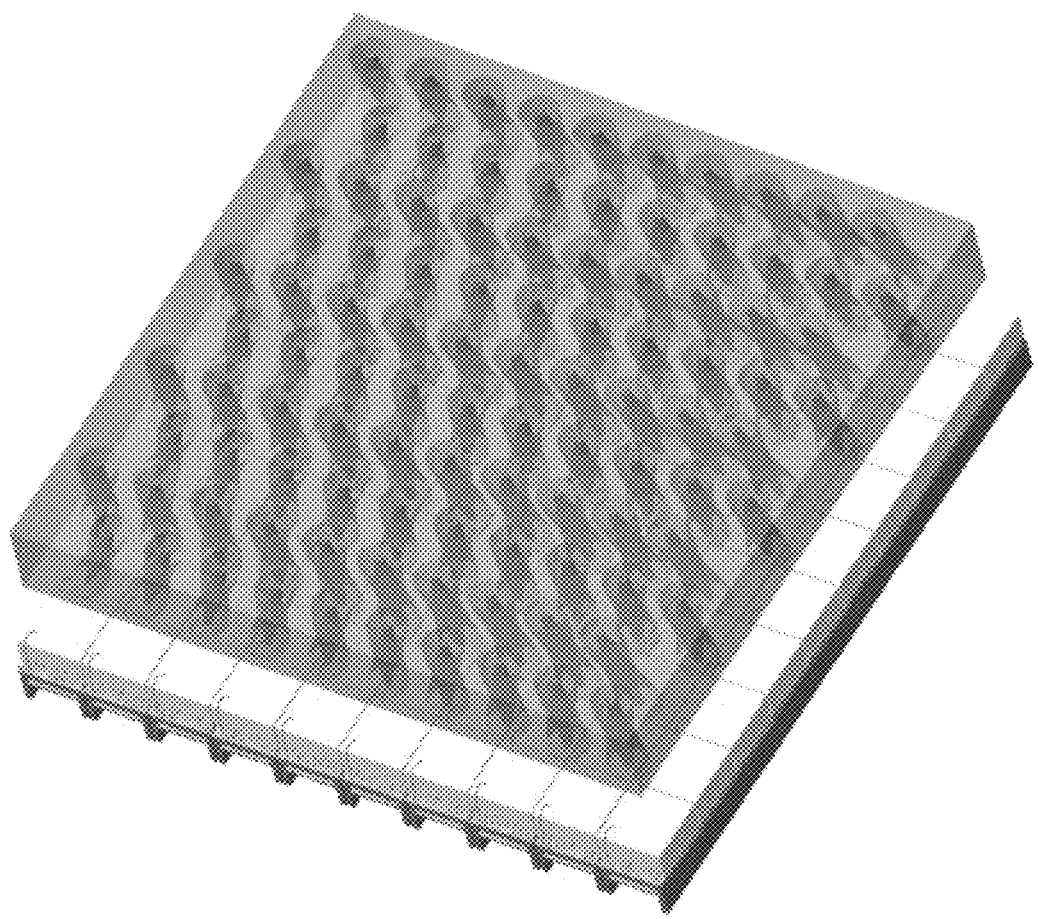
FIG. 16 shows a synthetic compound eye gamma camera design 1600 according to an embodiment that comprises an array of micro-camera-elements. Each micro-camera-element of this embodiment has a detector area shown in a square coupled with a micro-ring aperture.

Referring now to FIG. 16, a synthetic compound eye gamma camera design according to an embodiment is shown. As seen, this embodiment provides for micro-ring compound-eye apertures disposed on panel 1600. In various embodiments, the micro-ring aperture offers 2 different dimensions (the inner and outer radius) to be adjusted for a given imaging application. In one example, a narrow difference between the inner and outer diameter of the ring-opening would lead to a high spatial resolution. In one example, a larger ring diameter can ensure a large open-fraction/sensitivity. In one example, the annulus is isotropic (does not have a preferential direction such as the slit) and can ensure a uniform spatial resolution in the FOV. In one example, the aperture design assures that the projection from a given micro-ring is properly confined within the corresponding detector element.

Figure 17:
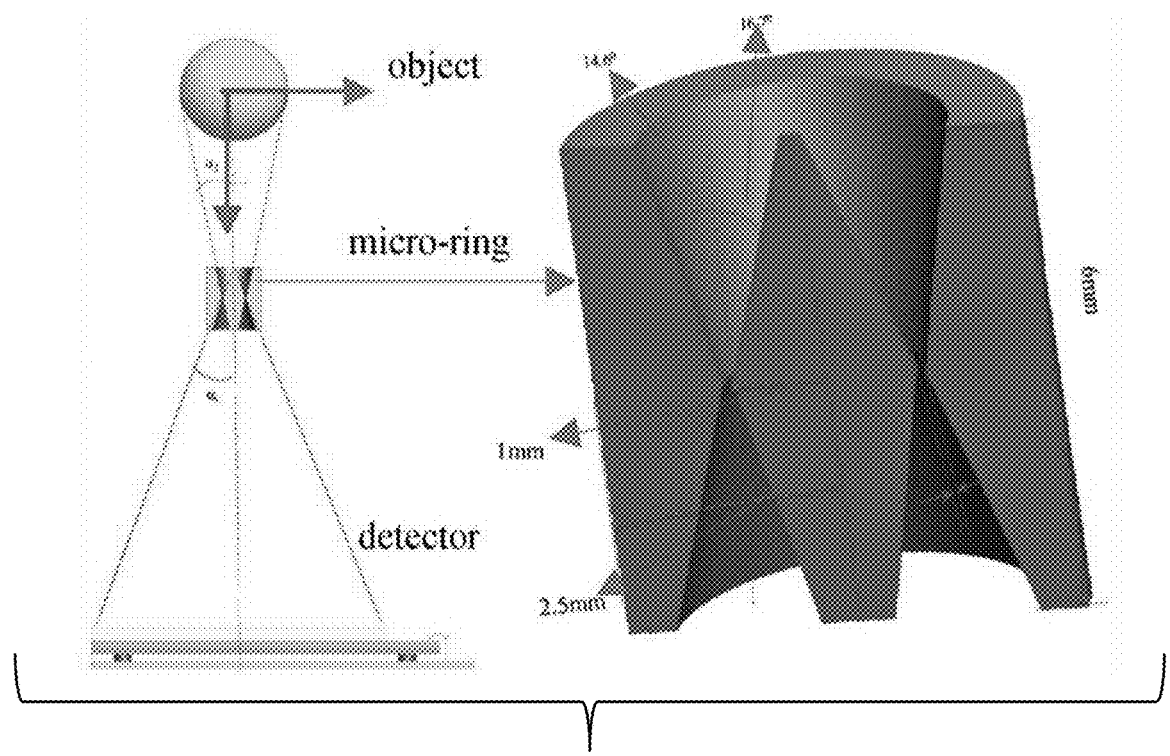
FIGS. 17 and 18 show a single micro-ring aperture (of the type of apertures shown in FIG. 16) according to various embodiments (as seen, the actual opening in this design is a narrow annulus rather than a round hole as in the pinhole case)
Figure 18:
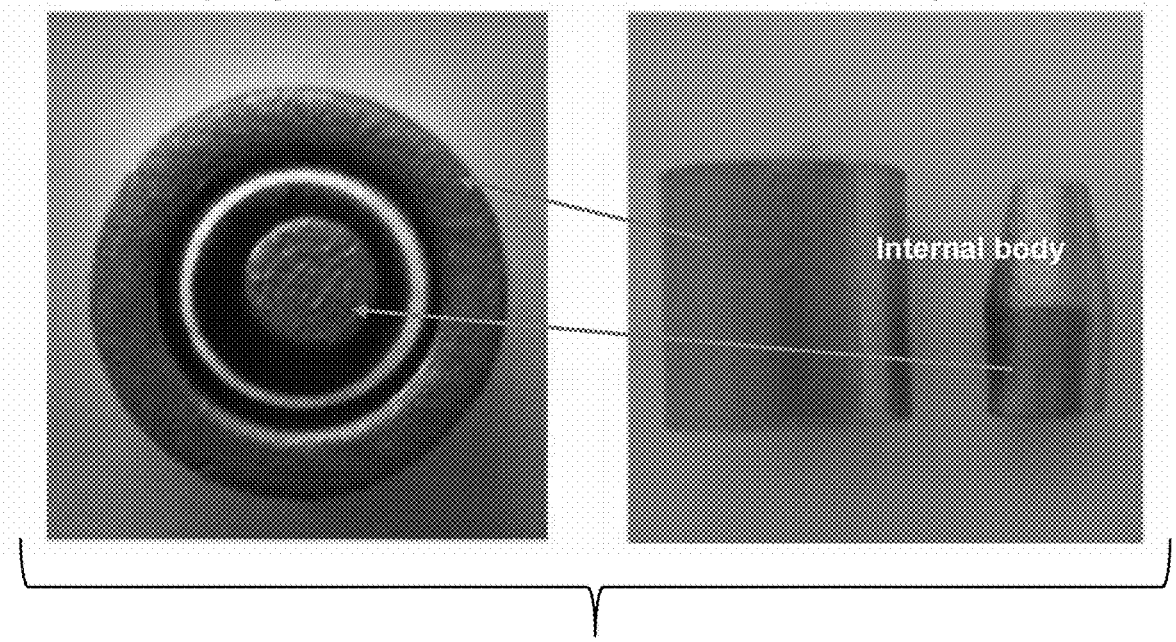

Referring now to FIGS. 17 and 18, a single micro-ring aperture (of the type of apertures shown in FIG. 16) according to an embodiment is shown. As seen, for such a single micro-ring aperture the actual opening is a narrow annulus rather than a round hole as in, for example, the pinhole case. Various advantages provided by a single micro-ring aperture according to an embodiment include: (a) a micro-ring aperture offers a bigger open-fraction for incident gamma rays in comparison to certain conventional pinholes, thus achieving higher sensitivity; and/or (b) an appropriate ring-width can be chosen to control the spatial resolution.

Figure 19:
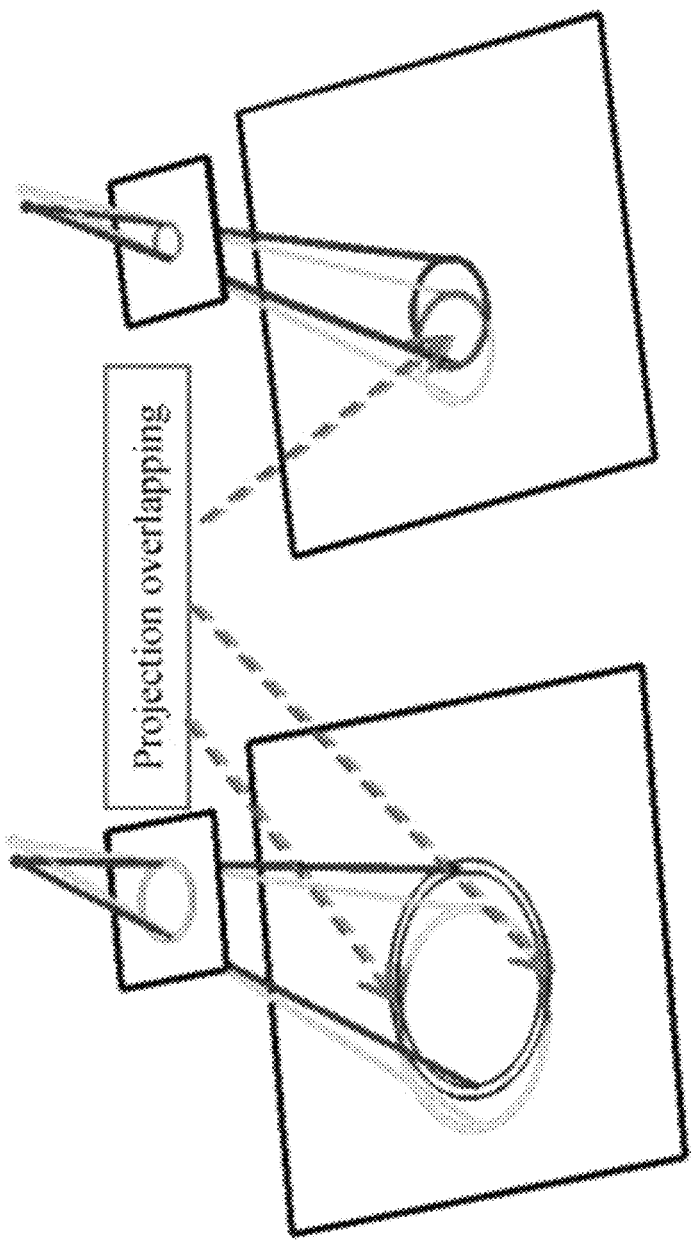
FIG. 19 illustrates resolution properties according to various embodiments in connection with the projection of two point-sources through a micro-ring aperture (Left) and a micro-pinhole aperture (Right).

Referring now to FIG. 19, this figure illustrates certain micro-ring resolution properties according to an embodiment as follows: (a) spatial resolution is defined as the smallest distance between two close points that an imaging system is able to resolve; (b) with the micro-ring aperture, the projection of a point-source on the detector plane will be an elongated ring of very narrow width; (c) appropriate ring-width can be chosen so that the projection overlapping between two resolution elements (the two closest points in object space that one wants to resolve) can be well-controlled. In comparison with the pinhole case, the two small cross-sections between the two ring shape profiles offer a smaller overlapping.

In one embodiment, an obtaining of first imaging data (e.g., by a given micro-camera-element or a given group of micro-camera-elements) can be at the same time (simultaneous with) an obtaining of second imaging data (e.g., by another given micro-camera-element or another given group of micro-camera-elements).

In one embodiment, an obtaining of first imaging data (e.g., by a given micro-camera-element or a given group of micro-camera-elements) can be at approximately the same time (substantially simultaneous with) an obtaining of second imaging data (e.g., by another given micro-camera-element or another given group of micro-camera-elements).

In one embodiment, an obtaining of first imaging data (e.g., by a given micro-camera-element or a given group of micro-camera-elements) can occur over a first time period, an obtaining of second imaging data (e.g., by another given micro-camera-element or another given group of micro-camera-elements) can occur over a second time period, and the first time period and the second time period can be the same (that is, each time period overlaps the other entirely).

In one embodiment, an obtaining of first imaging data (e.g., by a given micro-camera-element or a given group of micro-camera-elements) can occur over a first time period, an obtaining of second imaging data (e.g., by another given micro-camera-element or another given group of micro-camera-elements) can occur over a second time period, and the first time period and the second time period can partially overlap.

In one embodiment, a given panel can have a combination of differently shaped apertures (e.g., one or more slit apertures, one or more pinhole apertures, one or more ring-shaped apertures, one or more star-shaped apertures, and/or one or more apertures of other shapes). In one embodiment, a given panel can have a combination of differently sized sensors.

Referring now to FIG. 20, various steps of a method 2000 according to an embodiment are shown. As seen in this FIG. 20, step 2002 comprises obtaining during imaging of a target object, by a first micro-camera-element comprising a-first sensor portion and a first aperture structure, first imaging data, wherein the first aperture structure and the first sensor portion are located relative to each other such that the first aperture structure and the first sensor portion cooperate in obtaining the first imaging data, and wherein the first imaging data comprises a first spatial resolution and a first field-of-view. Next, step 2004 comprises obtaining during the imaging of the target object, by a second micro-camera-element comprising a second sensor portion and a second aperture structure, second imaging data, wherein the second aperture structure and the second sensor portion are located relative to each other such that the second aperture structure and the second sensor portion cooperate in obtaining the second imaging data, wherein the second imaging data comprises a second spatial resolution and a second field-of-view, wherein the first spatial resolution differs from the second spatial resolution, and wherein the first field-of-view differs from the second field-of-view. Next, step 2006 comprises generating, by a processing system including a processor, combined imaging data, wherein the combined imaging data is based upon the first imaging data obtained by the first micro-camera-element and the second imaging data obtained by the second micro-camera-element.

While for purposes of simplicity of explanation, the respective processes are shown and described as a series of blocks in FIG. 20, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 21:
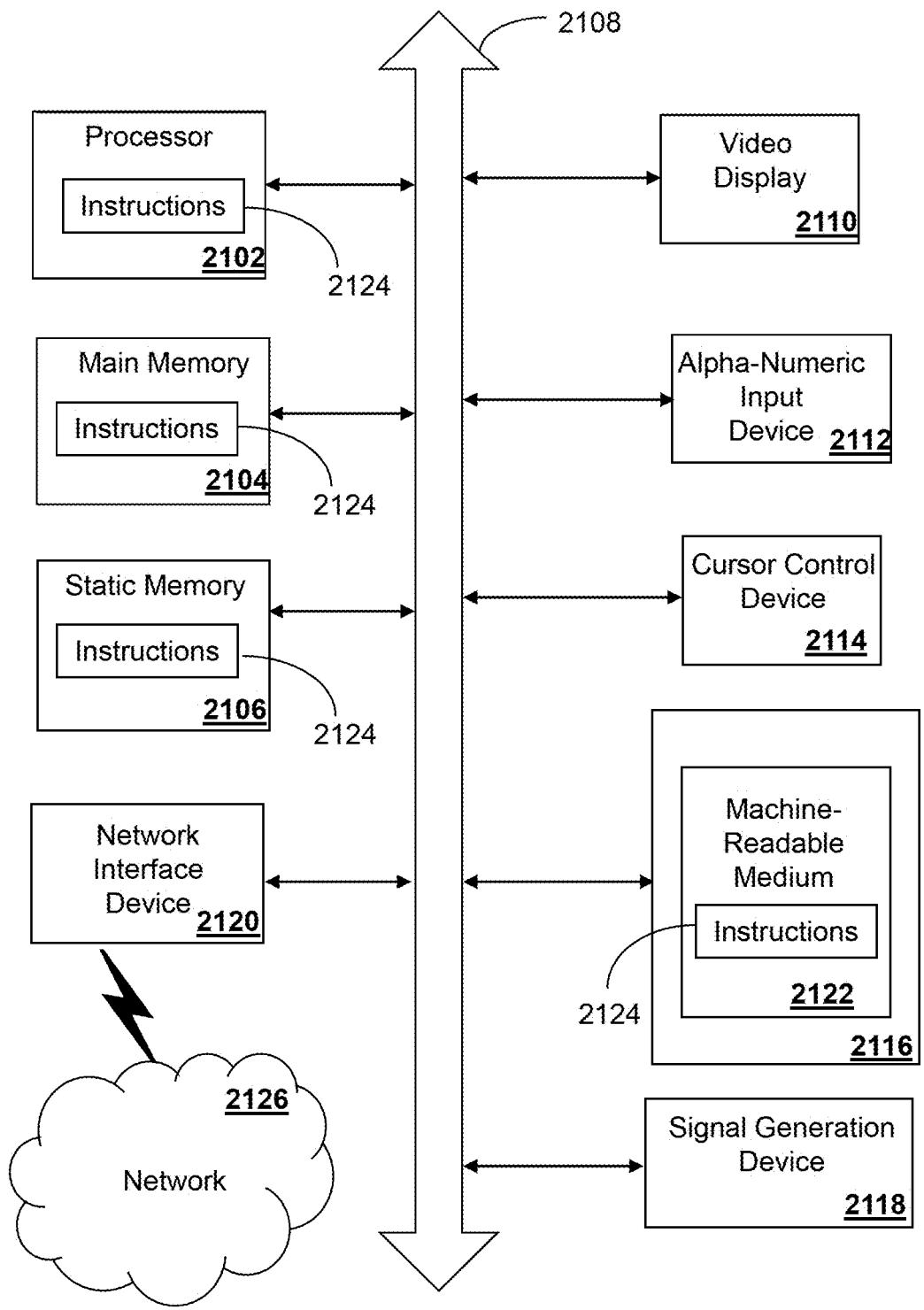
FIG. 21 is a block diagram illustrating an example, non-limiting embodiment of a system in accordance with various aspects described herein.
Figure 22:
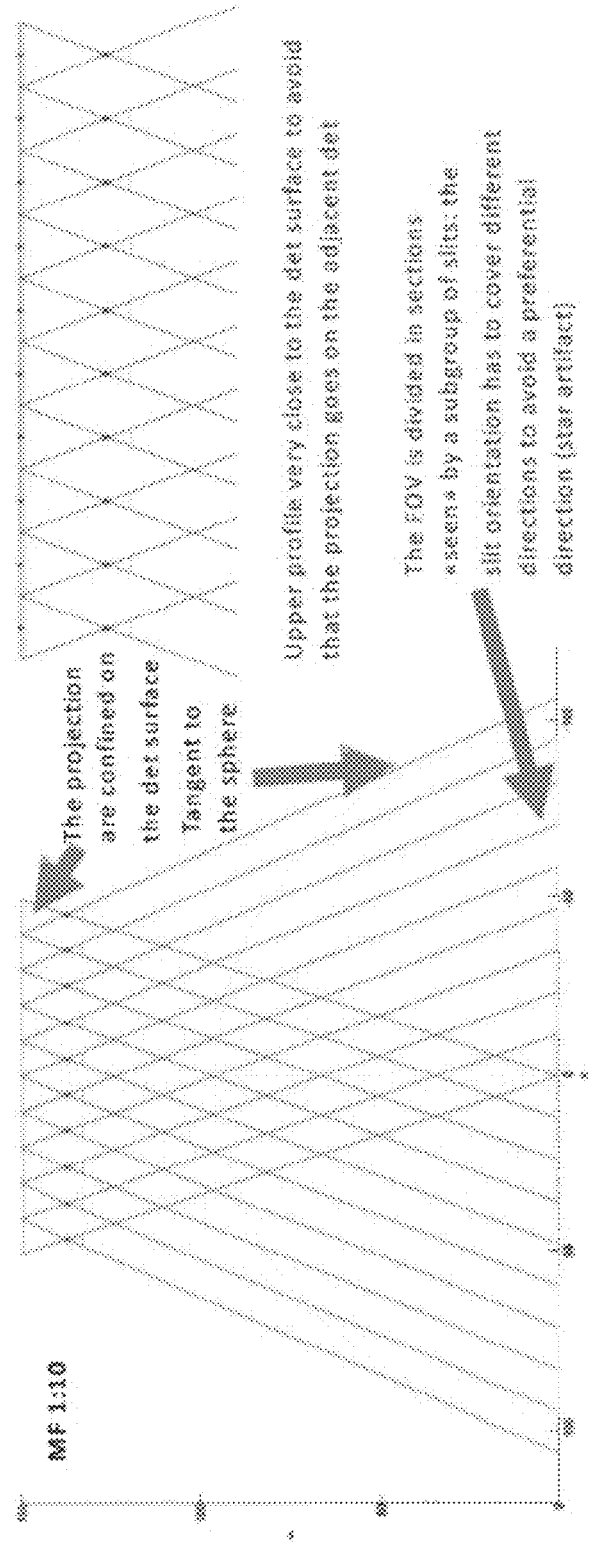
FIG. 22 depicts an example of the angular coverage provided by a synthetic compound eye gamma camera that comprises multiple micro-camera-elements. In this design, each micro-camera-element has a limited angular coverage only seeing a small area within the entire object. When placing multiple micro-camera-elements in a synthetic compound eye (SCE) camera as shown in FIG. 22, the entire SCE camera panel can provide a full angular coverage over the entire object.
Figure 23:
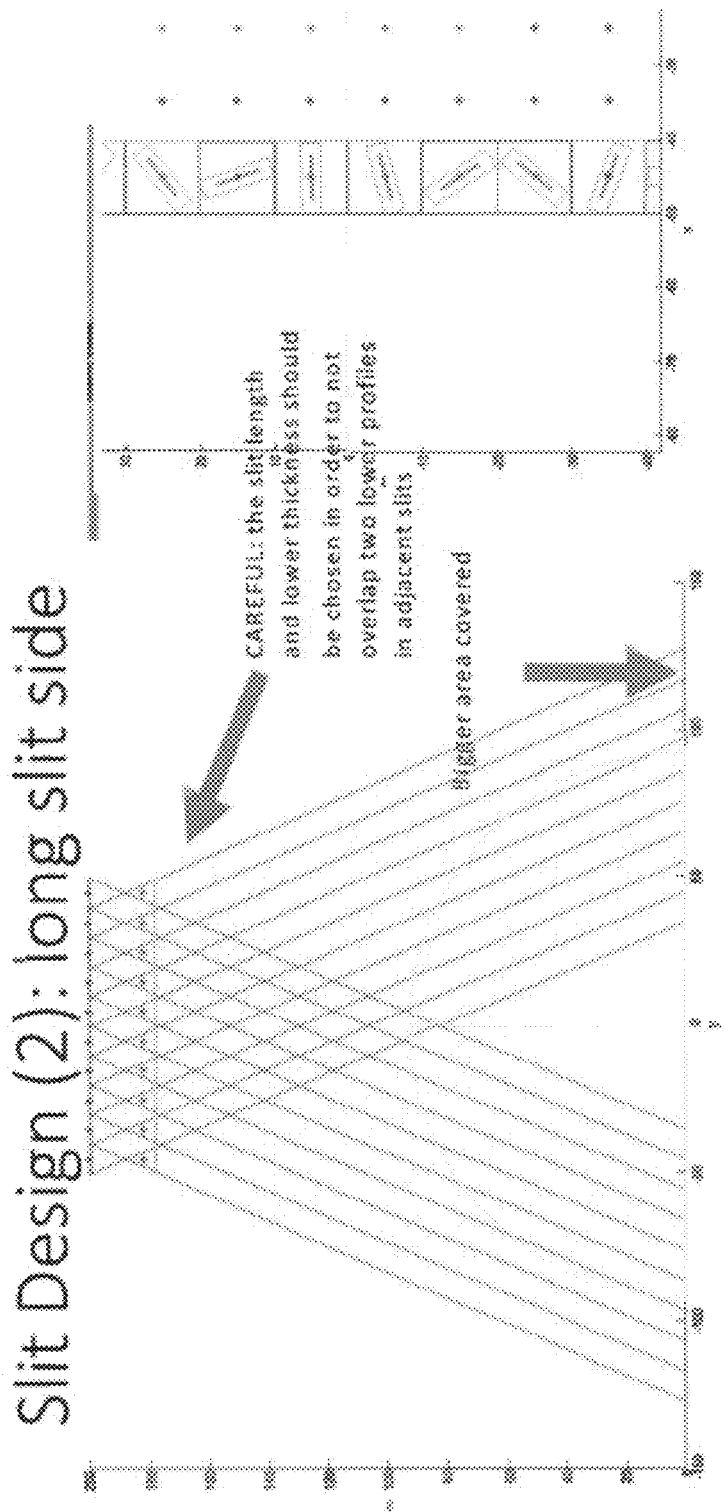
FIG. 23 depicts the angular coverage provided by a SCE camera that comprises multiple micro-camera-elements. Each micro-camera-element has a micro-slit aperture coupled to a small detector area.
Figure 24:
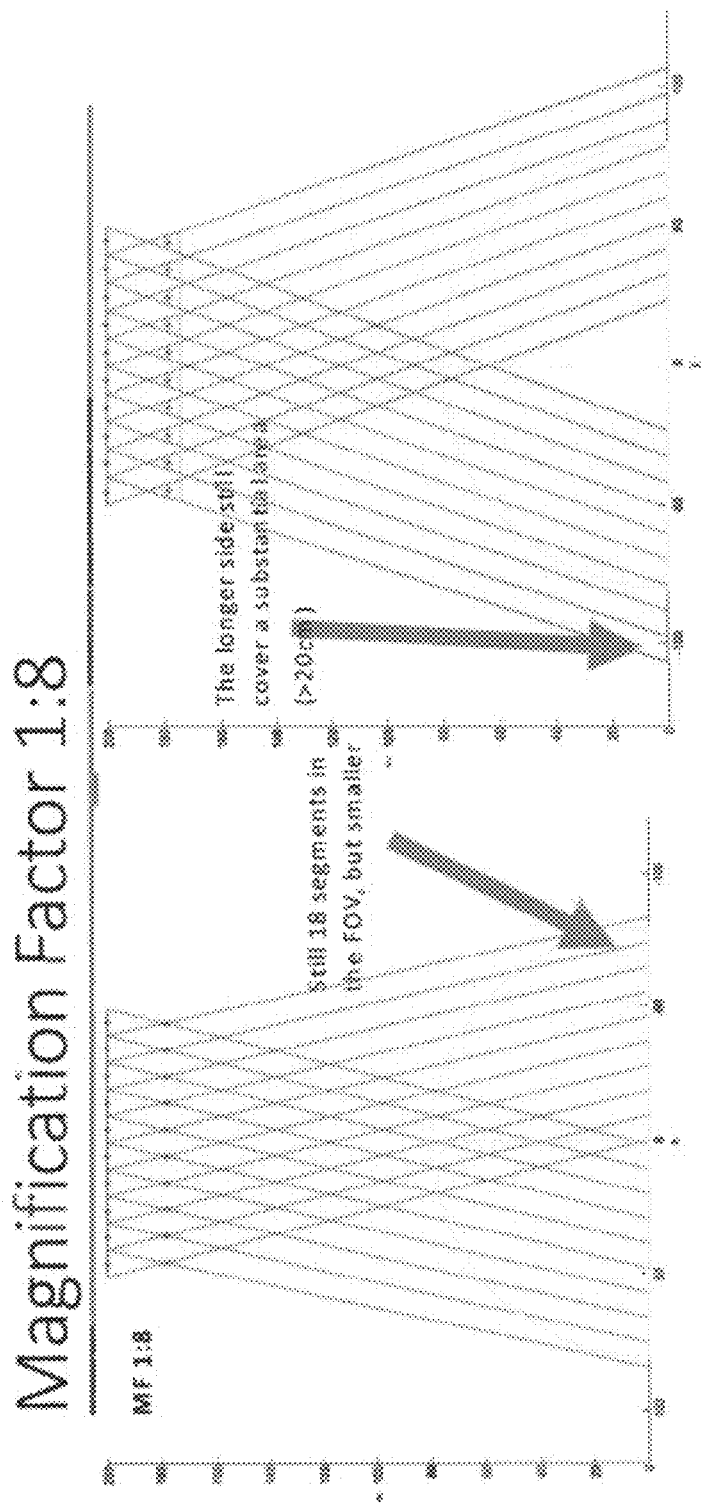
FIG. 24 depicts the angular coverage offered by a SCE camera that consists of multiple micro-slit apertures. This figure illustrates that the longer side of a given micro-slit aperture provides a wider angular coverage along the longer side of the opening on the aperture, and the shorter side of the given micro-slit aperture provides a narrower angular coverage, but at the same time a better spatial resolution for resolving imaging features that are varying along the shorter side of the micro-slit aperture.
Figure 25:
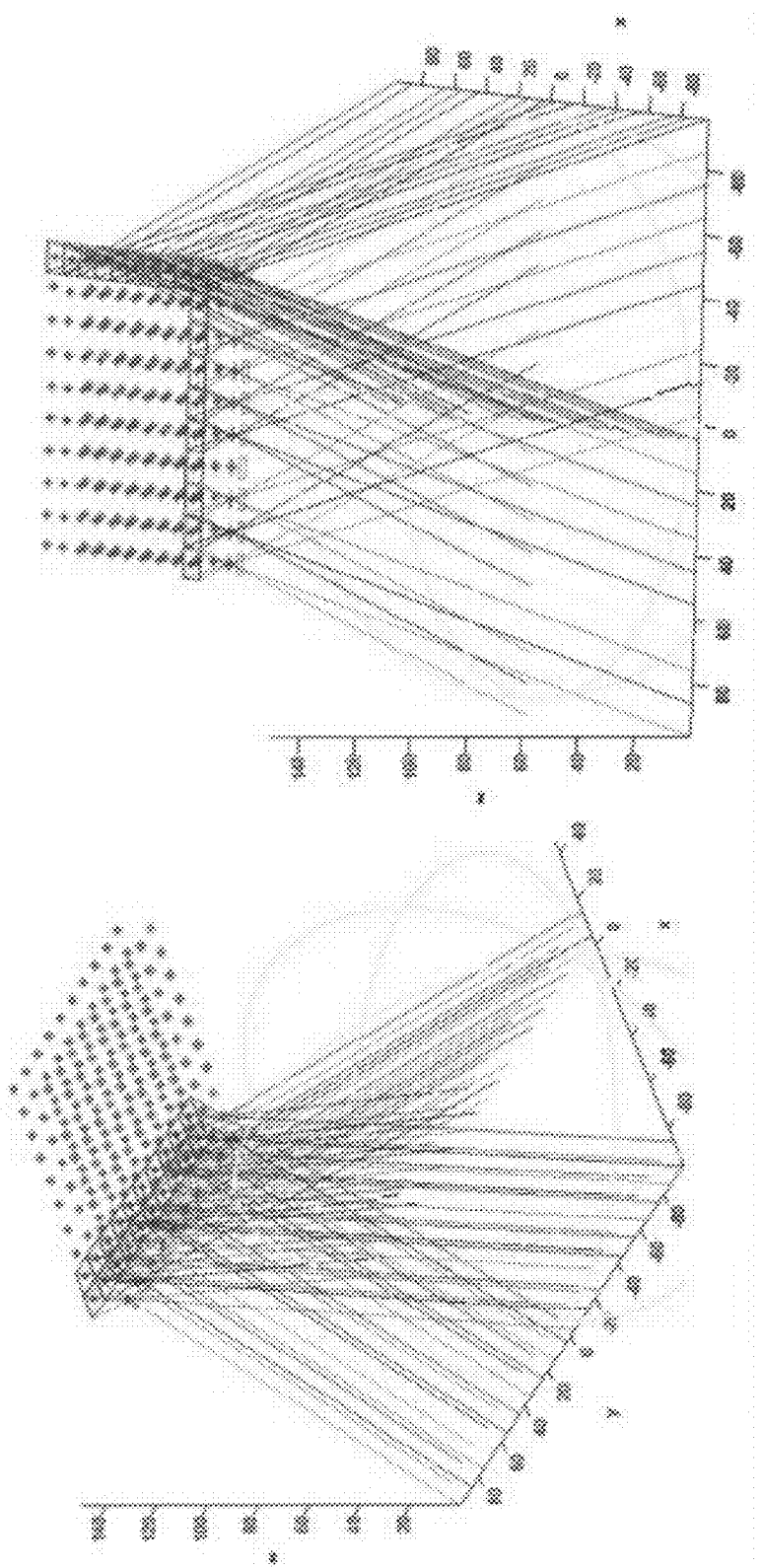
FIG. 25 depicts a further illustration of an SCE camera comprising a 2-D array of micro-camera-elements wherein each has a micro-slit aperture. Within the SCE, the directions of individual slit apertures are randomly distributed. So each micro-camera-element would provide a distinct angular coverage. During an imaging study, all the micro-camera-elements in a SCE camera panel work together to collect imaging information about the object and each provide a subset of imaging information with distinct imaging properties.
Figure 26:
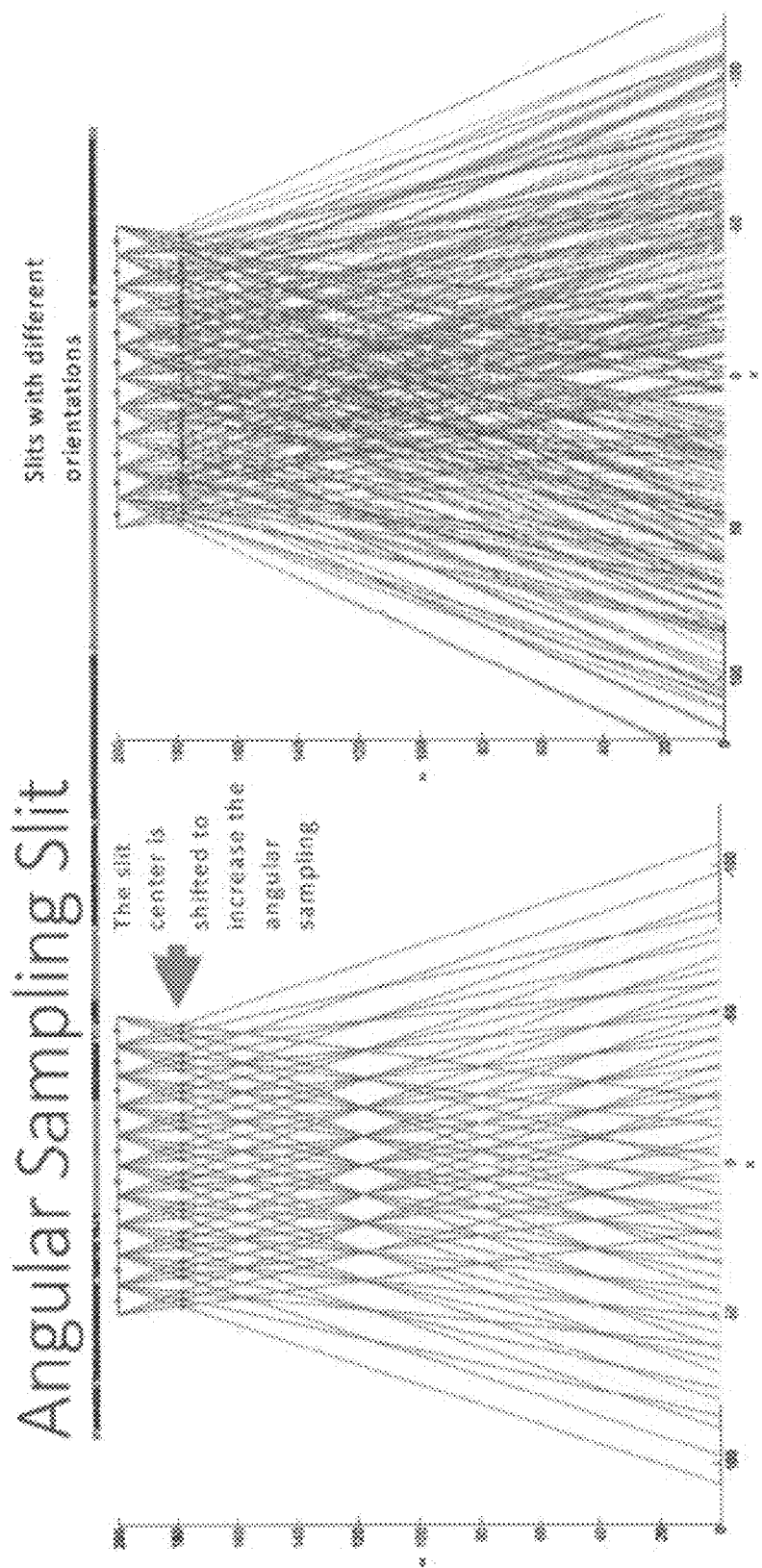
FIG. 26 depicts two possible designs of an SCE camera that offers 20 cm diameter and 15 cm diameter field-of-view.

Referring now to FIG. 21, this depicts an example diagrammatic representation of a machine in the form of a computer system 2100 within which a set of instructions, when executed, may cause the machine to perform any one or more of the methods discussed herein. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2100 may include a processor 2102 (e.g., a controller, a central processing unit (CPU), a graphics processing unit (GPU, or any combination thereof), a main memory 2104 and a static memory 2106, which communicate with each other via a bus 2108. The computer system 2100 may further include a video display unit 2110 (e.g., a liquid crystal display (LCD), a flat panel, or a solid state display). The computer system 2100 may include an input device 2112 (e.g., a keyboard), a cursor control device 2114 (e.g., a mouse), a disk drive unit 2116, a signal generation device 2118 (e.g., a speaker or remote control) and a network interface device 2120.

The disk drive unit 2116 may include a tangible computer-readable storage medium 2122 on which is stored one or more sets of instructions (e.g., software 2124) embodying any one or more of the methods or functions described herein, including those methods illustrated above. The instructions 2124 may also reside, completely or at least partially, within the main memory 2104, the static memory 2106, and/or within the processor 2102 during execution thereof by the computer system 2100. The main memory 2104 and the processor 2102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations and/or methods described herein are intended for operation as software programs running or executed by or on a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods and/or operations described herein. It is further noted that a computing device such as a processor, a controller, a state machine or other suitable device for executing instructions to perform operations and/or methods may perform such operations and/or methods directly or indirectly by way of one or more intermediate devices directed by the computing device.

While the tangible computer-readable storage medium 2122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods and/or operations of the subject disclosure. The term "non-transitory" as in a non-transitory computer-readable storage medium includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 2100.

In distributed environments, the embodiments described in the subject disclosure can be adapted to utilize multiple display units controlled by two or more computer systems. In this configuration, presentations described by the subject disclosure can in part be shown in a first of the display units, while the remaining portion is presented in a second of the display units.

Application specific integrated circuit(s) and/or programmable logic array(s) can use downloadable instructions for executing state machines and/or circuit configurations to implement embodiments of the subject disclosure.

As described herein, various embodiments can comprise SPECT in combination with PET (positron emission tomography) and/or with MRI (magnetic resonance imaging). In various examples, such combination can be used in the context of pre-clinical and/or clinical applications.

In one specific example, a synthetic compound eye gamma camera (utilizing a plurality of micro-slits) can have the following specifications: (a) a CZT detector having an active area. The 10×10 cm active area is divided into 10×10 sensor areas, each is 1 cm×1 cm in size. Two arrays along the axial direction (2 rings) are used; (b) a magnification ratio of 1:10 (10 cm in the object space is projected in 1 cm on the detection surface); (c) 100 micro-slit/panel, 250 µm wide, 5 mm long; (d) each sensor area of 1 cm×1 cm in size is coupled with only one slit aperture (compound-eye geometry); and/or (e) a designed field-of-view of 18.5 cm diameter.

In one embodiment, provided is an apparatus, comprising:
  a plurality of panels, wherein each panel is positioned at a different viewing angle of a target object, wherein each panel senses a plurality of two-dimensional (2D) projections from fractional views of a volume of interest of the target object at a viewing angle corresponding to the panel, and wherein each panel comprises:
    a plurality of micro-camera-elements (e.g., aperture structures) having different apertures for receiving gamma rays from the fractional views of the volume of interest of the target object at the viewing angle corresponding to the panel, wherein each individual micro-camera-element (MCE) is designed to collect a specific set of imaging information regarding the target object that is complementary to the information being collected by other micro-camera-elements;
    a plurality of sensors aligned with the plurality of micro-camera-elements for generating the plurality of 2D projections from the fractional views of the volume of interest of the target object at the viewing angle corresponding to the panel;
  a memory to store instructions; and
  a processor coupled to the plurality of panels and the memory, wherein responsive to executing the instructions, the processor performs operations comprising:
    receiving, from each panel, the plurality of 2D projections of the fractional views of the volume of interest of the target object at the viewing angle corresponding to the panel; and
    generating, from the plurality of 2D projections of the fractional views of the volume of interest provided by each panel, a three-dimensional (3D) image of a 3D section of the target object.

As described herein, various embodiments provide for a synthetic compound eye (SCE) gamma camera design having a plurality of panels comprising a plurality of micro-camera-elements (MCE's). Each MCE can include a small area of position-sensitive gamma ray detector and a collimation aperture that is a piece of heavy metal with an opening of various shapes, such as micro-slit, micro-ring, micro-star-shaped openings, or a pinhole, to allow gamma rays to pass through (to each corresponding detection area). Each MCE can be, in effect, an independent micro-gamma camera, which has a limited open angle to collect photons emitted from a sub-region of a target object. A single camera system can include a large number of micro-camera-elements (MCE's), wherein each MCE (or each group of MCE's) can be designed to offer a unique imaging property.

As described herein, various embodiments provide a synthetic compound eye (SCE) gamma camera for SPECT Imaging (e.g., in the context of molecular imaging and/or cardiac perfusion imaging).

From the foregoing descriptions, it would be evident to an artisan with ordinary skill in the art that the aforementioned embodiments can be modified, reduced, or enhanced without departing from the scope and spirit of the claims described below. For example, any desired number of panels, cameras and/or micro-camera-elements can be utilized. Other suitable modifications can be applied to the subject disclosure. Accordingly, the reader is directed to the claims for a fuller understanding of the breadth and scope of the subject disclosure.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a first micro-camera-element comprising a first sensor area and a first aperture element, wherein the first sensor area has a first planar surface, wherein the first aperture element has a first structural configuration, wherein the first structural configuration comprises a first elongated slit having a first short side, a first long side, and a first longitudinal axis corresponding to the first long side, wherein the first longitudinal axis is substantially parallel to the first planar surface, wherein the first aperture element and the first sensor area are disposed relative to each other in order to cooperate in obtaining first imaging data having first characteristics, and wherein the first characteristics comprise a first imaging resolution and a first field-of-view;
a second micro-camera-element comprising a second sensor area and a second aperture element, wherein the second sensor area has a second planar surface, wherein the second planar surface is substantially coplanar with the first planar surface, wherein the second aperture element has a second structural configuration, wherein the second structural configuration comprises a second elongated slit having a second short side, a second long side, and a second longitudinal axis corresponding to the second long side, wherein the second longitudinal axis is substantially parallel to the second planar surface, wherein the second longitudinal axis is non-parallel relative to the first longitudinal axis, wherein the second aperture element and the second sensor area are disposed relative to each other in order to cooperate in obtaining second imaging data having second characteristics, wherein the second characteristics comprise a second imaging resolution and a second field-of-view, and wherein the first imaging resolution differs from the second imaging resolution;
a processing system including a processor; and
a memory that stores executable instructions that, when executed by the processing system, facilitate performance of operations, the operations comprising:
receiving, from the first micro-camera-element, the first imaging data, the first imaging data being obtained by the first micro-camera-element during imaging of a target object;
receiving, from the second micro-camera-element, the second imaging data, the second imaging data being obtained by the second micro-camera-element during the imaging of the target object; and
generating, based upon the first imaging data and the second imaging data that are received, combined imaging data.

2. The device of claim 1, wherein the first sensor area has a first size that is a same size as a second size of the second sensor area.

3. The device of claim 1, wherein the first sensor area has a first size that is larger than a second size of the second sensor area.

4. The device of claim 1, wherein the first characteristics further comprise a first geometrical efficiency, wherein the second characteristics further comprise a second geometrical efficiency, wherein the first field-of-view differs from the second field-of-view, and wherein the first geometrical efficiency differs from the second geometrical efficiency.

5. The device of claim 1, wherein each of the first imaging data and the second imaging data is based upon received gamma rays, and wherein each of the first imaging data and the second imaging data is obtained during single-photon emission computed tomography imaging.

6. The device of claim 1, wherein each of the first imaging data and the second imaging data is two-dimensional imaging data.

7. The device of claim 1, wherein the combined imaging data is three-dimensional imaging data.

8. An apparatus, comprising:
a first panel comprising a first plurality of sensor portions and a first plurality of structures, wherein a first structure of the first plurality of structures has a first aperture through which first gamma rays can pass, wherein the first aperture has a first cross-sectional area, wherein the first structure and a first sensor portion of the first plurality of sensor portions are disposed relative to each other in order to cooperate in obtaining first imaging data having first characteristics, wherein the first aperture comprises a first elongated slit having a first short side, a first long side, and a first longitudinal axis corresponding to the first long side, and wherein the first longitudinal axis has a first length;
a second panel comprising a second plurality of sensor portions and a second plurality of structures, wherein a second structure of the second plurality of structures has a second aperture with a second shape through which second gamma rays can pass, wherein the second aperture has a second cross-sectional area, wherein the second cross-sectional area is larger than the first cross-sectional area, wherein the second structure and a second sensor portion of the second plurality of sensor portions are disposed relative to each other in order to cooperate in obtaining second imaging data having second characteristics, wherein the second aperture comprises a second elongated slit having a second short side, a second long side, and a second longitudinal axis corresponding to the second long side, wherein the second longitudinal axis has a second length, and wherein the second length is greater than the first length;
a processing system including a processor; and
a memory that stores executable instructions that, when executed by the processing system, facilitate performance of operations, the operations comprising:
receiving, from the first panel, the first imaging data, resulting in first received imaging data, the first imaging data being obtained by the first panel during an imaging process applied to a target object;
receiving, from the second panel, the second imaging data, resulting in second received imaging data, the second imaging data being obtained by the second panel during the imaging process applied to the target object; and
generating, based upon the first received imaging data and the second received imaging data, combined imaging data.

9. The apparatus of claim 8, wherein the first gamma rays and the second gamma rays are received from the target object, wherein the first panel is oriented relative to the target object in a first orientation, wherein the second panel is oriented relative to the target object in a second orientation, wherein the first orientation is different from the second orientation, and wherein the apparatus is a single-photon emission computed tomography imaging device.

10. A method, comprising:
obtaining during imaging of a target object, by a first micro-camera-element comprising a first sensor portion and a first aperture structure, first imaging data, wherein the first aperture structure and the first sensor portion are located relative to each other such that the first aperture structure and the first sensor portion cooperate in obtaining the first imaging data, wherein the first imaging data comprises a first spatial resolution and a first field-of-view, and wherein a first aperture of the first aperture structure is in a first form of a pinhole, a slit, or a ring;
obtaining during the imaging of the target object, by a second micro-camera-element comprising a second sensor portion and a second aperture structure, second imaging data, wherein the second aperture structure and the second sensor portion are located relative to each other such that the second aperture structure and the second sensor portion cooperate in obtaining the second imaging data, wherein the second imaging data comprises a second spatial resolution and a second field-of-view, wherein the first spatial resolution differs from the second spatial resolution, wherein the first field-of-view differs from the second field-of-view, wherein, in a first case that the first form is a pinhole, then a second aperture of the second aperture structure is in a second form of a slit or a ring, wherein, in a second case that the first form is a slit, then the second aperture is in the second form of a pinhole or a ring, and wherein, in a third case that the first form is a ring, then the second aperture is in the second form of a pinhole or a slit; and
generating, by a processing system including a processor, combined imaging data, wherein the combined imaging data is based upon the first imaging data obtained by the first micro-camera-element and the second imaging data obtained by the second micro-camera-element.

11. The method of claim 10, wherein the combined imaging data is three-dimensional imaging data of a human subject.

12. The method of claim 11, wherein each of the first imaging data and the second imaging data is obtained via single-photon emission computed tomography.

13. The device of claim 1, wherein:
the first sensor area comprises a first plurality of pixels;
the first structural configuration comprises a first end that is adjacent to the first sensor area;
the first end is configured to cover the first plurality of pixels;
the second sensor area comprises a second plurality of pixels;
the second structural configuration comprises a second end that is adjacent to the second sensor area; and
the second end is configured to cover the second plurality of pixels.

14. The device of claim 1, further comprising a plurality of micro-camera-elements including the first micro-camera-element, the second micro-camera-element, and one or more additional micro-camera-elements.

15. The device of claim 1, wherein the second longitudinal axis is angularly offset from the first longitudinal axis by an angle, wherein the angle is greater than 0 degrees, and wherein the angle is less than or equal to 90 degrees.

16. The apparatus of claim 8, wherein:
the first short side is substantially 0.25 mm;
the first long side is substantially 5 mm;
the second short side is substantially 0.25 mm; and
the second long side is substantially 12.5 mm.

17. The apparatus of claim 8, wherein the first sensor portion has a first size that is a same size as a second size of the second sensor portion.

18. The apparatus of claim 8, wherein the first sensor portion has a first size that is larger than a second size of the second sensor portion.

19. The apparatus of claim 8, wherein:
the first sensor portion comprises a first plurality of pixels;
the first structure comprises a first end that is adjacent to the first sensor portion;
the first end is configured to cover the first plurality of pixels;
the second sensor portion comprises a second plurality of pixels;
the second structure comprises a second end that is adjacent to the second sensor portion; and
the second end is configured to cover the second plurality of pixels.

20. The method of claim 10, wherein:
the first sensor portion comprises a first plurality of pixels;
the first aperture structure comprises a first end that is adjacent to the first sensor portion;
the first end is configured to cover the first plurality of pixels;
the second sensor portion comprises a second plurality of pixels;
the second aperture structure comprises a second end that is adjacent to the second sensor portion; and
the second end is configured to cover the second plurality of pixels.

* * * * *